United States Patent
Rivard et al.

(10) Patent No.: US 11,375,085 B2
(45) Date of Patent: *Jun. 28, 2022

(54) SYSTEMS AND METHODS FOR CAPTURING DIGITAL IMAGES

(71) Applicant: Duelight LLC, Sunnyvale, CA (US)

(72) Inventors: William Guie Rivard, Menlo Park, CA (US); Adam Barry Feder, Mountain View, CA (US); Brian J. Kindle, Sunnyvale, CA (US)

(73) Assignee: DUELIGHT LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/662,965

(22) Filed: Oct. 24, 2019

(65) Prior Publication Data
US 2020/0059575 A1 Feb. 20, 2020

Related U.S. Application Data

(63) Continuation of application No. 16/271,604, filed on Feb. 8, 2019, now Pat. No. 10,477,077, which is a
(Continued)

(51) Int. Cl.
*H04N 5/225* (2006.01)
*H04N 5/217* (2011.01)
(Continued)

(52) U.S. Cl.
CPC .............. *H04N 5/217* (2013.01); *G06T 7/13* (2017.01); *H04N 5/2256* (2013.01);
(Continued)

(58) Field of Classification Search
None
See application file for complete search history.

(56) References Cited

U.S. PATENT DOCUMENTS 4,873,561 A 10/1989 Wen
5,200,828 A 4/1993 Jang et al.
(Continued)

FOREIGN PATENT DOCUMENTS

CN 101290388 A 10/2008
CN 101408709 A 4/2009
(Continued)

OTHER PUBLICATIONS

Notice of Allowance from U.S. Appl. No. 16/584,486, dated Oct. 21, 2020.
(Continued)

*Primary Examiner* — Timothy J Henn
*Assistant Examiner* — Dwight Alex C Tejano
(74) *Attorney, Agent, or Firm* — Zilka-Kotab, P.C.

(57) ABSTRACT

A system, method, and computer program product are provided for capturing digital images. In use, an ambient image comprising a plurality of ambient pixels and a flash image comprising a plurality of flash pixels is captured, via a camera module. Next, at least one de-noised pixel based on the ambient image is generated. Additionally, a resulting image is generated by combining the at least one de-noised pixel and a corresponding flash pixel. Additional systems, methods, and computer program products are also presented.

18 Claims, 17 Drawing Sheets

Related U.S. Application Data continuation of application No. 15/636,324, filed on Jun. 28, 2017, now Pat. No. 10,469,714, which is a continuation of application No. 15/201,283, filed on Jul. 1, 2016, now Pat. No. 9,819,849.

(51) Int. Cl.
*H04N 5/33* (2006.01)
*H04N 5/357* (2011.01)
*G06T 7/13* (2017.01)
*H04N 5/232* (2006.01)
*H04N 5/235* (2006.01)
*H04N 5/445* (2011.01)

(52) U.S. Cl.
CPC ....... *H04N 5/2352* (2013.01); *H04N 5/23229* (2013.01); *H04N 5/33* (2013.01); *H04N 5/357* (2013.01); *H04N 5/44504* (2013.01); *G06T 2207/20192* (2013.01)

(56) References Cited

U.S. PATENT DOCUMENTS

| | | | |
|---|---|---|---|
| 5,363,209 A | 11/1994 | Eschbach et al. |
| 5,818,977 A | 10/1998 | Tansley |
| 5,867,215 A | 2/1999 | Kaplan |
| 6,115,065 A | 9/2000 | Yadid-Pecht et al. |
| 6,184,940 B1 | 2/2001 | Sano |
| 6,243,430 B1 | 6/2001 | Mathe |
| 6,365,950 B1 | 4/2002 | Sohn |
| 6,453,068 B1 | 9/2002 | Li |
| 6,498,926 B1 | 12/2002 | Ciccarelli et al. |
| 6,642,962 B1 | 11/2003 | Lin et al. |
| 6,788,338 B1 | 9/2004 | Dinev et al. |
| 6,996,186 B2 | 2/2006 | Ngai et al. |
| 7,084,905 B1 | 8/2006 | Nayar et al. |
| 7,088,351 B2 | 8/2006 | Wang |
| 7,098,952 B2 | 8/2006 | Morris et al. |
| 7,206,449 B2 | 4/2007 | Raskar et al. |
| 7,256,381 B2 | 8/2007 | Asaba |
| 7,265,784 B1 | 9/2007 | Frank |
| 7,518,645 B2 | 4/2009 | Farrier |
| 7,587,099 B2 | 9/2009 | Szeliski et al. |
| 7,599,569 B2 | 10/2009 | Smirnov et al. |
| 7,760,246 B2 | 7/2010 | Dalton et al. |
| 7,835,586 B2 | 11/2010 | Porikli |
| 7,907,791 B2 | 3/2011 | Kinrot et al. |
| 7,999,858 B2 | 8/2011 | Nayar et al. |
| 8,144,253 B2 | 3/2012 | Su et al. |
| 8,189,944 B1 | 5/2012 | Lim |
| 8,610,789 B1 | 12/2013 | Nayar et al. |
| 8,675,086 B1 | 3/2014 | Linzer |
| 8,723,284 B1 | 5/2014 | Hynecek |
| 8,761,245 B2 | 6/2014 | Puri et al. |
| 8,780,420 B1 | 7/2014 | Bluzer et al. |
| 8,811,757 B2 | 8/2014 | Batur |
| 8,854,421 B2 | 10/2014 | Kasahara |
| 8,878,963 B2 | 11/2014 | Prabhudesai et al. |
| 8,934,029 B2 | 1/2015 | Nayar et al. |
| 8,976,264 B2 | 3/2015 | Rivard et al. |
| 9,014,459 B2 | 4/2015 | Xiang et al. |
| 9,070,185 B2 | 6/2015 | Lee et al. |
| 9,083,905 B2 | 7/2015 | Wan et al. |
| 9,106,888 B2 | 8/2015 | Chou |
| 9,137,455 B1 | 9/2015 | Rivard et al. |
| 9,154,708 B1 | 10/2015 | Rivard et al. |
| 9,160,936 B1 | 10/2015 | Rivard et al. |
| 9,167,169 B1 | 10/2015 | Rivard et al. |
| 9,179,062 B1 | 11/2015 | Rivard et al. |
| 9,179,085 B1 | 11/2015 | Rivard et al. |
| 9,336,574 B2 | 5/2016 | Zhang et al. |
| 9,406,147 B2 | 8/2016 | Rivard et al. |
| 9,531,961 B2 | 12/2016 | Rivard et al. |
| 9,560,269 B2 | 1/2017 | Baldwin |
| 9,578,211 B2 | 2/2017 | Kong et al. |
| 9,600,741 B1 | 3/2017 | Su et al. |
| 9,661,327 B2 | 5/2017 | Nilsson |
| 9,807,322 B2 | 10/2017 | Feder et al. |
| 9,819,849 B1 * | 11/2017 | Rivard ................. H04N 5/357 |
| 9,860,461 B2 | 1/2018 | Feder et al. |
| 9,912,928 B2 | 3/2018 | Rivard et al. |
| 9,918,017 B2 | 3/2018 | Rivard et al. |
| 9,998,721 B2 | 6/2018 | Rivard et al. |
| 10,110,870 B2 | 10/2018 | Rivard et al. |
| 10,129,514 B2 | 11/2018 | Rivard et al. |
| 10,178,300 B2 | 1/2019 | Rivard et al. |
| 10,182,197 B2 | 1/2019 | Feder et al. |
| 10,270,958 B2 | 4/2019 | Rivard et al. |
| 10,372,971 B2 | 8/2019 | Rivard et al. |
| 10,375,369 B2 | 8/2019 | Rivard et al. |
| 10,382,702 B2 | 8/2019 | Rivard et al. |
| 10,469,714 B2 | 11/2019 | Rivard et al. |
| 10,477,077 B2 | 11/2019 | Rivard et al. |
| 10,498,982 B2 | 12/2019 | Feder et al. |
| 10,558,848 B2 | 2/2020 | Rivard et al. |
| 10,586,097 B2 | 3/2020 | Rivard et al. |
| 10,652,478 B2 | 5/2020 | Rivard et al. |
| 10,785,401 B2 | 9/2020 | Rivard et al. |
| 10,904,505 B2 | 1/2021 | Rivard et al. |
| 10,924,688 B2 | 2/2021 | Rivard et al. |
| 10,931,897 B2 | 2/2021 | Feder et al. |
| 11,025,831 B2 | 6/2021 | Rivard et al. |
| 2003/0015645 A1 | 1/2003 | Brickell et al. |
| 2003/0142745 A1 | 7/2003 | Osawa |
| 2004/0027471 A1 | 2/2004 | Koseki et al. |
| 2004/0181375 A1 | 9/2004 | Szu et al. |
| 2004/0184677 A1 | 9/2004 | Raskar et al. |
| 2004/0252199 A1 | 12/2004 | Cheung et al. |
| 2004/0263510 A1 | 12/2004 | Marschner et al. |
| 2005/0088570 A1 | 4/2005 | Seo |
| 2005/0134723 A1 | 6/2005 | Lee et al. |
| 2006/0015308 A1 | 1/2006 | Marschner et al. |
| 2006/0050165 A1 | 3/2006 | Amano |
| 2006/0087702 A1 | 4/2006 | Satoh et al. |
| 2006/0181614 A1 | 8/2006 | Yen et al. |
| 2006/0245014 A1 | 11/2006 | Haneda |
| 2007/0023798 A1 | 2/2007 | McKee |
| 2007/0025714 A1 | 2/2007 | Shiraki |
| 2007/0025717 A1 | 2/2007 | Raskar et al. |
| 2007/0030357 A1 | 2/2007 | Levien et al. |
| 2007/0110305 A1 | 5/2007 | Corcoran et al. |
| 2007/0242900 A1 | 10/2007 | Chen et al. |
| 2007/0248342 A1 | 10/2007 | Tamminen et al. |
| 2007/0263106 A1 | 11/2007 | Tanaka et al. |
| 2008/0018763 A1 | 1/2008 | Sato |
| 2008/0030592 A1 | 2/2008 | Border et al. |
| 2008/0107411 A1 | 5/2008 | Hope |
| 2008/0151097 A1 | 6/2008 | Chen et al. |
| 2008/0158398 A1 | 7/2008 | Yaffe et al. |
| 2008/0170160 A1 | 7/2008 | Lukac |
| 2008/0192064 A1 | 8/2008 | Hong et al. |
| 2009/0002475 A1 | 1/2009 | Jelley et al. |
| 2009/0066782 A1 | 3/2009 | Choi et al. |
| 2009/0153245 A1 | 6/2009 | Lee |
| 2009/0160992 A1 | 6/2009 | Inaba et al. |
| 2009/0175555 A1 | 7/2009 | Mahowald |
| 2009/0278922 A1 | 11/2009 | Tinker et al. |
| 2009/0295941 A1 | 12/2009 | Nakajima et al. |
| 2009/0309990 A1 | 12/2009 | Levoy et al. |
| 2009/0309994 A1 | 12/2009 | Inoue |
| 2009/0322903 A1 | 12/2009 | Hashimoto et al. |
| 2010/0073499 A1 | 3/2010 | Gere |
| 2010/0118204 A1 | 5/2010 | Proca et al. |
| 2010/0165178 A1 | 7/2010 | Chou et al. |
| 2010/0165181 A1 | 7/2010 | Murakami et al. |
| 2010/0182465 A1 | 7/2010 | Okita |
| 2010/0194851 A1 | 8/2010 | Pasupaleti et al. |
| 2010/0194963 A1 | 8/2010 | Terashima |
| 2010/0201831 A1 | 8/2010 | Weinstein |
| 2010/0208099 A1 | 8/2010 | Nomura |
| 2010/0231747 A1 | 9/2010 | Yim |
| 2010/0265079 A1 | 10/2010 | Yin |
| 2010/0302407 A1 | 12/2010 | Ayers et al. |

(56) References Cited

U.S. PATENT DOCUMENTS

| | | |
|---|---|---|
| 2011/0019051 A1 | 1/2011 | Yin et al. |
| 2011/0090385 A1 | 4/2011 | Aoyama et al. |
| 2011/0096192 A1 | 4/2011 | Niikura |
| 2011/0115971 A1 | 5/2011 | Furuya et al. |
| 2011/0134267 A1 | 6/2011 | Ohya |
| 2011/0150332 A1 | 6/2011 | Sibiryakov et al. |
| 2011/0194618 A1 | 8/2011 | Gish et al. |
| 2011/0242334 A1* | 10/2011 | Wilburn ............... H04N 5/272 348/207.1 |
| 2011/0279698 A1 | 11/2011 | Yoshikawa |
| 2011/0280541 A1 | 11/2011 | Lee |
| 2012/0002082 A1 | 1/2012 | Johnson et al. |
| 2012/0002089 A1 | 1/2012 | Wang et al. |
| 2012/0008011 A1 | 1/2012 | Garcia Manchado |
| 2012/0033118 A1 | 2/2012 | Lee et al. |
| 2012/0057786 A1 | 3/2012 | Yano |
| 2012/0069213 A1 | 3/2012 | Jannard et al. |
| 2012/0154541 A1 | 6/2012 | Scott |
| 2012/0154627 A1 | 6/2012 | Rivard et al. |
| 2012/0162465 A1 | 6/2012 | Culbert et al. |
| 2012/0177352 A1 | 7/2012 | Pillman et al. |
| 2012/0188392 A1 | 7/2012 | Smith |
| 2012/0206582 A1 | 8/2012 | DiCarlo et al. |
| 2012/0212661 A1 | 8/2012 | Yamaguchi et al. |
| 2012/0242844 A1 | 9/2012 | Walker et al. |
| 2012/0242886 A1 | 9/2012 | Kawarada |
| 2012/0262600 A1 | 10/2012 | Velarde et al. |
| 2012/0274806 A1 | 11/2012 | Mori |
| 2012/0287223 A1 | 11/2012 | Zhang et al. |
| 2012/0314100 A1 | 12/2012 | Frank |
| 2013/0010075 A1 | 1/2013 | Gallagher et al. |
| 2013/0021447 A1 | 1/2013 | Brisedoux et al. |
| 2013/0027580 A1 | 1/2013 | Olsen et al. |
| 2013/0050520 A1 | 2/2013 | Takeuchi |
| 2013/0070145 A1 | 3/2013 | Matsuyama |
| 2013/0107062 A1 | 5/2013 | Okazaki |
| 2013/0114894 A1 | 5/2013 | Yadav et al. |
| 2013/0140435 A1 | 6/2013 | Kikuchi |
| 2013/0147979 A1 | 6/2013 | McMahon et al. |
| 2013/0148013 A1 | 6/2013 | Shiohara |
| 2013/0176458 A1 | 7/2013 | Van Dalen et al. |
| 2013/0194963 A1 | 8/2013 | Hampel |
| 2013/0223530 A1 | 8/2013 | Demos |
| 2013/0228673 A1 | 9/2013 | Hashimoto et al. |
| 2013/0235068 A1 | 9/2013 | Ubillos et al. |
| 2013/0271631 A1 | 10/2013 | Tatsuzawa et al. |
| 2013/0278798 A1 | 10/2013 | Hattori |
| 2013/0279584 A1 | 10/2013 | Demos |
| 2013/0293744 A1 | 11/2013 | Attar et al. |
| 2013/0301729 A1 | 11/2013 | Demos |
| 2013/0335596 A1 | 12/2013 | Demandolx et al. |
| 2013/0342526 A1 | 12/2013 | Ng et al. |
| 2013/0342740 A1 | 12/2013 | Govindarao |
| 2014/0009636 A1 | 1/2014 | Lee et al. |
| 2014/0063287 A1 | 3/2014 | Yamada |
| 2014/0063301 A1 | 3/2014 | Solhusvik |
| 2014/0098248 A1 | 4/2014 | Okazaki |
| 2014/0168468 A1 | 6/2014 | Levoy et al. |
| 2014/0176757 A1 | 6/2014 | Rivard et al. |
| 2014/0184894 A1 | 7/2014 | Motta |
| 2014/0192216 A1 | 7/2014 | Matsumoto |
| 2014/0192267 A1 | 7/2014 | Biswas et al. |
| 2014/0193088 A1 | 7/2014 | Capata et al. |
| 2014/0198242 A1 | 7/2014 | Weng et al. |
| 2014/0211852 A1 | 7/2014 | Demos |
| 2014/0244858 A1 | 8/2014 | Okazaki |
| 2014/0247979 A1 | 9/2014 | Roffet et al. |
| 2014/0267869 A1 | 9/2014 | Sawa |
| 2014/0300795 A1 | 10/2014 | Bilcu et al. |
| 2014/0301642 A1 | 10/2014 | Muninder |
| 2014/0354781 A1 | 12/2014 | Matsuyama |
| 2015/0005637 A1 | 1/2015 | Stegman et al. |
| 2015/0077581 A1 | 3/2015 | Baltz et al. |
| 2015/0092852 A1 | 4/2015 | Demos |
| 2015/0098651 A1 | 4/2015 | Rivard et al. |
| 2015/0103192 A1 | 4/2015 | Venkatraman et al. |
| 2015/0138366 A1 | 5/2015 | Keelan et al. |
| 2015/0222809 A1 | 8/2015 | Osuka et al. |
| 2015/0229819 A1 | 8/2015 | Rivard et al. |
| 2015/0279113 A1 | 10/2015 | Knorr et al. |
| 2015/0334318 A1 | 11/2015 | Georgiev et al. |
| 2015/0341593 A1 | 11/2015 | Zhang et al. |
| 2016/0028948 A1 | 1/2016 | Omori et al. |
| 2016/0065926 A1 | 3/2016 | Nonaka et al. |
| 2016/0071289 A1 | 3/2016 | Kobayashi et al. |
| 2016/0086318 A1 | 3/2016 | Hannuksela et al. |
| 2016/0142610 A1 | 5/2016 | Rivard et al. |
| 2016/0150147 A1 | 5/2016 | Shioya |
| 2016/0150175 A1 | 5/2016 | Hynecek |
| 2016/0219211 A1 | 7/2016 | Katayama |
| 2016/0248968 A1 | 8/2016 | Baldwin |
| 2016/0284065 A1 | 9/2016 | Cohen |
| 2016/0316154 A1 | 10/2016 | Elmfors et al. |
| 2016/0323518 A1 | 11/2016 | Rivard et al. |
| 2016/0381304 A9 | 12/2016 | Feder et al. |
| 2017/0048442 A1 | 2/2017 | Cote et al. |
| 2017/0054966 A1 | 2/2017 | Zhou et al. |
| 2017/0061234 A1 | 3/2017 | Lim et al. |
| 2017/0061236 A1 | 3/2017 | Pope |
| 2017/0061567 A1 | 3/2017 | Lim et al. |
| 2017/0064192 A1 | 3/2017 | Mori |
| 2017/0064227 A1 | 3/2017 | Lin et al. |
| 2017/0064276 A1 | 3/2017 | Rivard et al. |
| 2017/0070690 A1 | 3/2017 | Feder et al. |
| 2017/0076430 A1 | 3/2017 | Xu |
| 2017/0085785 A1 | 3/2017 | Corcoran et al. |
| 2017/0302903 A1 | 10/2017 | Ng et al. |
| 2017/0374336 A1 | 12/2017 | Rivard et al. |
| 2018/0007240 A1 | 1/2018 | Rivard et al. |
| 2018/0063409 A1 | 3/2018 | Rivard et al. |
| 2018/0063411 A1 | 3/2018 | Rivard et al. |
| 2018/0077367 A1 | 3/2018 | Feder et al. |
| 2018/0160092 A1 | 6/2018 | Rivard et al. |
| 2018/0183989 A1 | 6/2018 | Rivard et al. |
| 2019/0045165 A1 | 2/2019 | Rivard et al. |
| 2019/0108387 A1 | 4/2019 | Rivard et al. |
| 2019/0108388 A1 | 4/2019 | Rivard et al. |
| 2019/0116306 A1 | 4/2019 | Rivard et al. |
| 2019/0124280 A1 | 4/2019 | Feder et al. |
| 2019/0174028 A1 | 6/2019 | Rivard et al. |
| 2019/0197297 A1 | 6/2019 | Rivard et al. |
| 2019/0335151 A1 | 10/2019 | Rivard et al. |
| 2019/0349510 A1 | 11/2019 | Rivard et al. |
| 2020/0029008 A1 | 1/2020 | Rivard et al. |
| 2020/0084398 A1 | 3/2020 | Feder et al. |
| 2020/0193144 A1 | 6/2020 | Rivard et al. |
| 2020/0259991 A1 | 8/2020 | Rivard et al. |
| 2021/0037178 A1 | 2/2021 | Rivard et al. |

FOREIGN PATENT DOCUMENTS

| | | |
|---|---|---|
| CN | 102053453 A | 5/2011 |
| CN | 103152519 A | 6/2013 |
| CN | 103813098 A | 5/2014 |
| CN | 204316606 U | 5/2015 |
| CN | 105026955 A | 11/2015 |
| DE | 102011107844 A1 | 1/2013 |
| EP | 2169946 A2 | 3/2010 |
| EP | 2346079 A1 | 7/2011 |
| EP | 2565843 A2 | 3/2013 |
| EP | 2731326 A2 | 5/2014 |
| GB | 2486878 A | 7/2012 |
| GB | 2487943 A | 8/2012 |
| JP | 2000278532 A | 10/2000 |
| JP | 2002112008 A | 4/2002 |
| JP | 2003101886 A | 4/2003 |
| JP | 2004247983 A | 9/2004 |
| JP | 2004248061 A | 9/2004 |
| JP | 2004326119 A | 11/2004 |
| JP | 2004328532 A | 11/2004 |
| JP | 2006080752 A | 3/2006 |
| JP | 2006121612 A | 5/2006 |
| JP | 2007035028 A | 2/2007 |
| JP | 2008236726 A | 10/2008 |

(56) References Cited

FOREIGN PATENT DOCUMENTS

| | | | |
|---|---|---|---|
| JP | 2009267923 A | 11/2009 |
| JP | 2009303010 A | 12/2009 |
| JP | 2010016416 A | 1/2010 |
| JP | 2010136224 A | 6/2010 |
| JP | 2010157925 A | 7/2010 |
| JP | 2010166281 A | 7/2010 |
| JP | 2010239317 A | 10/2010 |
| JP | 1649623 B2 | 3/2011 |
| JP | 2011097141 A | 5/2011 |
| JP | 2011101180 A | 5/2011 |
| JP | 2011120094 A | 6/2011 |
| JP | 2011146957 A | 7/2011 |
| JP | 2012156885 A | 8/2012 |
| JP | 2012195660 A | 10/2012 |
| JP | 2012213137 A | 11/2012 |
| JP | 2013055610 A | 3/2013 |
| JP | 2013066142 A | 4/2013 |
| JP | 2013093875 A | 5/2013 |
| JP | 2013120254 A | 6/2013 |
| JP | 2013207327 A | 10/2013 |
| JP | 2013219708 A | 10/2013 |
| JP | 2013258444 A | 12/2013 |
| JP | 2013258510 A | 12/2013 |
| JP | 2014057256 A | 3/2014 |
| JP | 2014140247 A | 7/2014 |
| JP | 2014142836 A | 8/2014 |
| JP | 2014155033 A | 8/2014 |
| KR | 20100094200 A | 8/2010 |
| WO | 9746001 A1 | 12/1997 |
| WO | 0237830 A2 | 5/2002 |
| WO | 2004064391 A1 | 7/2004 |
| WO | 2008010559 A1 | 1/2008 |
| WO | 2009074938 A2 | 6/2009 |
| WO | 2014172059 A2 | 10/2014 |
| WO | 2015123455 A1 | 8/2015 |
| WO | 2015173565 A1 | 11/2015 |

OTHER PUBLICATIONS

Corrected Notice of Allowance from U.S. Appl. No. 16/505,278, dated Oct. 22, 2020.
Notice of Allowance from U.S. Appl. No. 16/684,389, dated Oct. 29, 2020.
Office Action from Japanese Patent Application No. 2017-544281, dated Oct. 27, 2020.
Office Action from Chinese Patent Application No. 201780053926.9, dated Oct. 13, 2020.
Corrected Notice of Allowance from U.S. Appl. No. 16/584,486, dated Nov. 18, 2020.
Corrected Notice of Allowance from U.S. Appl. No. 16/505,278, dated Nov. 18, 2020.
Corrected Notice of Allowance from U.S. Appl. No. 16/684,389, dated Nov. 27, 2020.
Office Action from Japanese Patent Application No. 2017-544280, dated Jun. 30, 2020.
Corrected Notice of Allowance from U.S. Appl. No. 16/505,278, dated Dec. 24, 2020.
Corrected Notice of Allowance from U.S. Appl. No. 16/584,486, dated Dec. 24, 2020.
Second Office Action from Chinese Patent Application No. 201680088945.0, dated Dec. 17, 2020.
Corrected Notice of Allowance from U.S. Appl. No. 16/684,389, dated Dec. 23, 2020.
Rivard et al., U.S. Appl. No. 17/144,915, filed Jan. 8, 2021.
Notice of Allowance from U.S. Appl. No. 16/857,016, dated Jan. 27, 2021.
Office Action from Japanese Patent Application No. 2017-544282, dated Jan. 5, 2021.
Office Action from Japanese Patent Application No. 2017-544283, dated Jan. 12, 2021.
Notice of Allowance from U.S. Appl. No. 13/573,252, dated Oct. 22, 2014.
Non-Final Office Action from U.S. Appl. No. 13/573,252, dated Jul. 10, 2014.
Rivard, W et al., U.S. Appl. No. 14/568,045, filed Dec. 11, 2014.
Restriction Requirement from U.S. Appl. No. 14/568,045, dated Jan. 15, 2015.
Rivard, W. et al., U.S. Appl. No. 14/534,068, filed Nov. 5, 2014.
Non-Final Office Action from U.S. Appl. No. 14/534,068, dated Feb. 17, 2015.
Feder et al., U.S. Appl. No. 13/999,678, filed Mar. 14, 2014.
Rivard, W. et al., U.S. Appl. No. 14/534,079, filed Nov. 5, 2014.
Non-Final Office Action from U.S. Appl. No. 14/534,079, dated Jan. 29, 2015.
Rivard, W. et al., U.S. Appl. No. 14/534,089, filed Nov. 5, 2014.
Non-Final Office Action from U.S. Appl. No. 14/534,089, dated Feb. 25, 2015.
Rivard, W. et al., U.S. Appl. No. 14/535,274, filed Nov. 6, 2014.
Non-Final Office Action from U.S. Appl. No. 14/535,274, dated Feb. 3, 2015.
Rivard, W. et al., U.S. Appl. No. 14/535,279, filed Nov. 6, 2014.
Non-Final Office Action from U.S. Appl. No. 14/535,279, dated Ferbuary 5, 2015.
Rivard, W. et al., U.S. Appl. No. 14/535,282, filed Nov. 6, 2014.
Non-Final Office Action from U.S. Appl. No. 14/535,282, dated Jan. 30, 2015.
Non-Final Office Action from U.S. Appl. No. 14/536,524, dated Mar. 3, 2015.
Rivard, W. et al., U.S. Appl. No. 14/536,524, filed Nov. 7, 2014.
Non-Final Office Action from U.S. Appl. No. 14/568,045, dated Mar. 24, 2015.
Rivard, W. et al., U.S. Appl. No. 14/702,549, filed May 1, 2015.
Notice of Allowance from U.S. Appl. No. 14/534,079, dated May 11, 2015.
Notice of Allowance from U.S. Appl. No. 14/535,274, dated May 26, 2015.
Notice of Allowance from U.S. Appl. No. 14/534,089, dated Jun. 23, 2015.
Notice of Allowance from U.S. Appl. No. 14/535,282, dated Jun. 23, 2015.
Notice of Allowance from U.S. Appl. No. 14/536,524, dated Jun. 29, 2015.
Notice of Allowance from U.S. Appl. No. 14/534,068, dated Jul. 29, 2015.
Notice of Allowance from U.S. Appl. No. 14/535,279, dated Aug. 31, 2015.
Final Office Action from U.S. Appl. No. 14/568,045, dated Sep. 18, 2015.
Non-Final Office Action from U.S. Appl. No. 13/999,678, dated Aug. 12, 2015.
International Search Report and Written Opinion from International Application No. PCT/US15/59348, dated Feb. 2, 2016.
International Search Report and Written Opinion from International Application No. PCT/US15/59097, dated Jan. 4, 2016.
Non-Final Office Action from U.S. Appl. No. 14/702,549, dated Jan. 25, 2016.
Final Office Action from U.S. Appl. No. 13/999,678, dated Mar. 28, 2016.
International Search Report and Written Opinion from International Application No. PCT/US2015/060476, dated Feb. 10, 2016.
Notice of Allowance from U.S. Appl. No. 14/568,045, dated Apr. 26, 2016.
International Search Report and Written Opinion from International Application No. PCT/US2015/058895, dated Apr. 11, 2016.
Notice of Allowance from U.S. Appl. No. 14/568,045, dated Jan. 12, 2016.
International Search Report and Written Opinion from International Application No. PCT/US2015/059103, dated Dec. 21, 2015.
Final Office Action from U.S. Appl. No. 14/178,305, dated May 18, 2015.
Non-Final Office Action from U.S. Appl. No. 14/178,305, dated Aug. 11, 2014.

(56) References Cited

OTHER PUBLICATIONS

Non-Final Office Action from U.S. Appl. No. 14/823,993, dated Jul. 28, 2016.
International Search Report and Written Opinion from International Application No. PCT/US2015/059105, dated Jul. 26, 2016.
Notice of Allowance from U.S. Appl. No. 14/702,549, dated Aug. 15, 2016.
International Search Report and Written Opinion from International Application No. PCT/US2015/058896, dated Aug. 26, 2016.
International Search Report and Written Opinion from International Application No. PCT/US2015/058891, dated Aug. 26, 2016.
International Search Report and Written Opinion from International Application No. PCT/US2016/050011, dated Nov. 10, 2016.
Final Office Action from U.S. Appl. No. 14/823,993, dated Feb. 10, 2017.
Non-Final Office Action from U.S. Appl. No. 15/354,935, dated Feb. 8, 2017.
Non-Final Office Action from U.S. Appl. No. 13/999,678, dated Dec. 20, 2016.
Supplemental Notice of Allowance from U.S. Appl. No. 16/213,041, dated Jun. 17, 2020.
Non-Final Office Action for U.S. Appl. No. 16/857,016, dated Aug. 5, 2020.
Rivard, W et al., U.S. Appl. No. 17/000,098, filed Aug. 21, 2020.
Office Action from Japanese Patent Application No. 2017-544284, dated Aug. 18, 2020.
Non-Final Office Action for U.S. Appl. No. 16/505,278, dated Jan. 10, 2020.
Notice of Allowance from U.S. Appl. No. 16/519,244, dated Jan. 14, 2020.
Office Action from Japanese Patent Application No. 2017-544282, dated Jan. 7, 2020.
Office Action from Chinese Patent Application No. 201780053926.9, dated Jan. 16, 2020.
Corrected Notice of Allowance from U.S. Appl. No. 16/519,244, dated Apr. 9, 2020.
Rivard et al., U.S. Appl. No. 16/857,016, filed Apr. 23, 2020.
International Preliminary Examination Report from PCT Application No. PCT/US2018/054014, dated Apr. 16, 2020.
Office Action from Chinese Patent Application No. 201680088945.0, dated May 21, 2020.
Notice of Allowance from U.S. Appl. No. 16/213,041, dated May 29, 2020.
Notice of Allowance from U.S. Appl. No. 16/505,278, dated Sep. 25, 2020.
Supplemental Notice of Allowance from U.S. Appl. No. 16/213,041, dated Aug. 31, 2020.
Summons to Attend Oral Proceedings from European Application No. 15 856 710.7, dated Sep. 18, 2020.
Wan et al., "CMOS Image Sensors With Multi-Bucket Pixels for Computational Photography," IEEE Journal of Solid-State Circuits, vol. 47, No. 4, Apr. 2012, pp. 1031-1042.
Notice of Allowance from U.S. Appl. No. 15/201,283, dated Mar. 23, 2017.
Chatterjee et al., "Clustering-Based Denoising With Locally Learned Dictionaries," IEEE Transactions on Image Processing, vol. 18, No. 7, Jul. 2009, pp. 1-14.
Burger et al., "Image denoising: Can plain Neural Networks compete with BM3D?," Computer Vision and Pattern Recognition (CVPR), IEEE, 2012, pp. 4321-4328.
Kervann et al., "Optimal Spatial Adaptation for Patch-Based Image Denoising," IEEE Transactions on Image Processing, vol. 15, No. 10, Oct. 2006, pp. 2866-2878.
Foi et al., "Practical Poissonian-Gaussian noise modeling and fitting for single-image raw-data," IEEE Transactions, 2007, pp. 1-18.
International Search Report and Written Opinion from PCT Application No. PCT/US17/39946, dated Sep. 25, 2017.
Notice of Allowance from U.S. Appl. No. 15/201,283, dated Jul. 19, 2017.
Notice of Allowance from U.S. Appl. No. 15/354,935, dated Aug. 23, 2017.
Notice of Allowance from U.S. Appl. No. 14/823,993, dated Oct. 31, 2017.
Notice of Allowance from U.S. Appl. No. 15/352,510, dated Oct. 17, 2017.
European Office Communication and Exam Report from European Application No. 15856814.7, dated Dec. 14, 2017.
Supplemental Notice of Allowance from U.S. Appl. No. 15/354,935, dated Dec. 1, 2017.
European Office Communication and Exam Report from European Application No. 15856267.8, dated Dec. 12, 2017.
European Office Communication and Exam Report from European Application No. 15856710.7, dated Dec. 21, 2017.
European Office Communication and Exam Report from European Application No. 15857675.1, dated Dec. 21, 2017.
European Office Communication and Exam Report from European Application No. 15856212.4, dated Dec. 15, 2017.
Non-Final Office Action from U.S. Appl. No. 15/254,964, dated Jan. 3, 2018.
Non-Final Office Action from U.S. Appl. No. 15/643,311, dated Jan. 4, 2018.
European Office Communication and Exam Report from European Application No. 15857386.5, dated Jan. 11, 2018.
Kim et al., "A CMOS Image Sensor Based on Unified Pixel Architecture With Time-Division Multiplexing Scheme for Color and Depth Image Acquisition," IEEE Journal of Solid-State Circuits, vol. 47, No. 11, Nov. 2012, pp. 2834-2845.
European Office Communication and Exam Report from European Application No. 15857748.6, dated Jan. 10, 2018.
Non-Final Office Action from U.S. Appl. No. 15/814,238, dated Feb. 8, 2018.
Non-Final Office Action for U.S. Appl. No. 15/687,278, dated Apr. 13, 2018.
Non-Final Office Action from U.S. Appl. No. 15/836,655, dated Apr. 6, 2018.
Notice of Allowance from U.S. Appl. No. 15/836,655, dated Apr. 30, 2018.
Rivard, W. et al., U.S. Appl. No. 15/891,251, filed Feb. 7, 2018.
Rivard et al., U.S. Appl. No. 14/823,993, filed Aug. 11, 2015.
Rivard et al., U.S. Appl. No. 14/536,524, filed Nov. 7, 2014.
Extended European Search Report from European Application No. 15891394.7 dated Jun. 19, 2018.
Non-Final Office Action for U.S. Appl. No. 15/885,296, dated Jun. 4, 2018.
Non-Final Office Action for U.S. Appl. No. 15/891,251, dated May 31, 2018.
Notice of Allowance from U.S. Appl. No. 15/687,278, dated Aug. 24, 2018.
Final Office Action for U.S. Appl. No. 15/643,311 dated Jul. 24, 2018.
Notice of Allowance for U.S. Appl. No. 15/885,296 dated Sep. 21, 2018.
Final Office Action for U.S. Appl. No. 15/254,964 dated Jul. 24, 2018.
Notice of Allowance for U.S. Appl. No. 15/814,238 dated Oct. 4, 2018.
Corrected Notice of Allowance for U.S. Appl. No. 15/885,296 dated Oct. 16, 2018.
Rivard et al., U.S. Appl. No. 16/154,999, filed Oct. 9, 2018.
Non-Final Office Action for U.S. Appl. No. 15/636,324, dated Oct. 18, 2018.
Notice of Allowance for U.S. Appl. No. 15/643,311, dated Oct. 31, 2018.
Corrected Notice of Allowance for U.S. Appl. No. 15/814,238 dated Nov. 13, 2018.
Final Office Action for U.S. Appl. No. 15/891,251, dated Nov. 29, 2018.
Rivard et al., U.S. Appl. No. 16/215,351, filed Dec. 10, 2018.
Rivard et al., U.S. Appl. No. 16/213,041, filed Dec. 7, 2018.
Non-Final Office Action for U.S. Appl. No. 16/154,999, dated Dec. 20, 2018.

(56) References Cited

OTHER PUBLICATIONS

Notice of Allowance for U.S. Appl. No. 15/254,964, dated Dec. 21, 2018.
Supplemental Notice of Allowance for U.S. Appl. No. 15/643,311, dated Dec. 11, 2018.
Feder et al., U.S. Appl. No. 16/217,848, filed Dec. 12, 2018.
International Preliminary Examination Report from PCT Application No. PCT/US2017/39946, dated Jan. 10, 2019.
Rivard et al., U.S. Appl. No. 16/796,497, filed Feb. 20, 2020.
Corrected Notice of Allowance from U.S. Appl. No. 16/519,244, dated Feb. 20, 2020.
Extended European Search Report from European Application No. 17821236.1, dated Jan. 24, 2020.
Petschnigg et al., "Digital Photography with Flash and No. Flash Image Pairs," ACM Transactions of Graphics, vol. 23, Aug. 2004, pp. 664-672.
Office Action from Japanese Patent Application No. 2017-544281, dated Nov. 26, 2019.
Extended European Search Report from European Application No. 16915389.7, dated Dec. 2, 2019.
Office Action from Japanese Patent Application No. 2017-544284, dated Dec. 10, 2019.
Feder et al., U.S. Appl. No. 16/684,389, filed Nov. 14, 2019.
International Search Report and Written Opinion from International Application No. PCT/US 18/54014, dated Dec. 26, 2018.
Non-Final Office Action from U.S. Appl. No. 16/215,351, dated Jan. 24, 2019.
Supplemental Notice of Allowance for U.S. Appl. No. 15/254,964, dated Feb. 1, 2019.
Rivard et al., U.S. Appl. No. 16/290,763, filed Mar. 1, 2019.
Supplemental Notice of Allowance for U.S. Appl. No. 15/254,964, dated Mar. 11, 2019.
Rivard et al., U.S. Appl. No. 15/976,756, filed May 10, 2018.
Final Office Action for U.S. Appl. No. 15/636,324, dated Mar. 22, 2019.
Non-Final Office Action from U.S. Appl. No. 16/271,604, dated Apr. 5, 2019.
Notice of Allowance from U.S. Appl. No. 16/215,351, dated Apr. 1, 2019.
Rivard et al., U.S. Appl. No. 16/271,604, filed Feb. 8, 2019.
Non-Final Office Action for U.S. Appl. No. 15/636,324, dated Apr. 18, 2019.
Notice of Allowance from U.S. Appl. No. 15/891,251, dated May 7, 2019.
Notice of Allowance from U.S. Appl. No. 16/154,999, dated Jun. 7, 2019.
Corrected Notice of Allowance from U.S. Appl. No. 15/891,251, dated Jul. 3, 2019.
Notice of Allowance from U.S. Appl. No. 15/636,324, dated Jul. 2, 2019.
Notice of Allowance from U.S. Appl. No. 16/271,604, dated Jul. 2, 2019.
Non-Final Office Action for U.S. Appl. No. 15/976,756, dated Jun. 27, 2019.
Non-Final Office Action for U.S. Appl. No. 16/290,763, dated Jun. 26, 2019.
Rivard et al., U.S. Appl. No. 16/505,278, filed Jul. 8, 2019.
Rivard et al., U.S. Appl. No. 16/519,244, filed Jul. 23, 2019.
Notice of Allowance from U.S. Appl. No. 16/217,848, dated Jul. 31, 2019.
Corrected Notice of Allowance from U.S. Appl. No. 16/271,604, dated Aug. 8, 2019.
Corrected Notice of Allowance from U.S. Appl. No. 15/636,324, dated Aug. 20, 2019.
Office Action from Chinese Patent Application No. 201580079444.1, dated Aug. 1, 2019.
Corrected Notice of Allowance from U.S. Appl. No. 15/636,324, dated Sep. 5, 2019.
Corrected Notice of Allowance from U.S. Appl. No. 16/271,604, dated Sep. 19, 2019.
Non-Final Office Action for U.S. Appl. No. 16/519,244, dated Sep. 23, 2019.
Corrected Notice of Allowance from U.S. Appl. No. 16/217,848, dated Sep. 24, 2019.
Examination Report from European Application No. 15 856 814.7, dated Aug. 20, 2019.
Examination Report from European Application No. 15 857 675.1, dated Aug. 23, 2019.
Examination Report from European Application No. 15 856 710.7, dated Sep. 9, 2019.
Examination Report from European Application No. 15 857 386.5, dated Sep. 17, 2019.
Examination Report from European Application No. 15 857 748.6, dated Sep. 26, 2019.
Rivard et al., U.S. Appl. No. 16/584,486, filed Sep. 26, 2019.
Notice of Allowance from U.S. Appl. No. 15/976,756, dated Oct. 4, 2019.
Notice of Allowance from U.S. Appl. No. 16/290,763, dated Oct. 10, 2019.
Corrected Notice of Allowance from U.S. Appl. No. 16/217,848, dated Oct. 31, 2019.
Non-Final Office Action for U.S. Appl. No. 16/213,041, dated Oct. 30, 2019.
Office Action from Japanese Patent Application No. 2017-544279, dated Oct. 23, 2019.
Office Action from Japanese Patent Application No. 2017-544280, dated Oct. 29, 2019.
Office Action from Japanese Patent Application No. 2017-544283, dated Oct. 29, 2019.
Office Action from Japanese Patent Application No. 2017-544547, dated Nov. 5, 2019.
Decision for Rejection and Decision of Dismissal of Amendment for Japanese Application No. 2017-544280, dated May 25, 2021.
Extended European Search Report from European Application No. 18864431.4, dated Jun. 1, 2021.
Kaufman et al., "Content-Aware Automatic Photo Enhancemen," Computer Graphics Forum, vol. 31, No. 08, 2012, pp. 2528-2540.
Battiato et al., "Automatic Image Enhancement by Content Dependent Exposure Correction," EURASIP Journal on Applied Signal Processing, 2004, pp. 1849-1860.
Mangiat et al., "Automatic scene relighting for video conferencing," IEEE 16th Annual International Conference on Image Processing (ICIP), Nov. 2009, pp. 2781-2784.
Weyrich et al., "Analysis of human faces using a measurement-based skin reflectance model," ACM Transactions on Graphics, vol. 25, No. 3, 2006, pp. 1013-1024.
Extended European Search Report from European Application No. 21169039.1, dated Jun. 16, 2021.
Office Action from Japanese Patent Application No. 2017-544284, dated Jul. 13, 2021.
Non-Final Office Action for U.S. Appl. No. 17/144,915, dated Aug. 13, 2021.
Corrected Notice of Allowance from U.S. Appl. No. 16/857,016, dated Feb. 16, 2021.
Feder et al., U.S. Appl. No. 17/171,800, filed Feb. 9, 2021.
Rivard et al., U.S. Appl. No. 17/163,086, filed Jan. 29, 2021.
Decision to Refuse from European Application No. 15856710.7, dated Mar. 15, 2021.
Examination Report from Indian Application No. 201827049041, dated Mar. 19, 2021.
Decision to Refuse from European Application No. 15856212.4, dated Mar. 22, 2021.
Corrected Notice of Allowance from U.S. Appl. No. 16/857,016, dated Apr. 13, 2021.
Examination Report from European Application No. 16915389.7, dated Feb. 25, 2021.
Examination Report from European Application No. 15857386.5, dated Feb. 8, 2021.
Rivard et al., U.S. Appl. No. 17/321,166, filed May 14, 2021.

\* cited by examiner

SYSTEMS AND METHODS FOR CAPTURING DIGITAL IMAGES

RELATED APPLICATIONS

The present application is a continuation of, and claims priority to U.S. patent application Ser. No. 16/271,604, titled "SYSTEMS AND METHODS FOR CAPTURING DIGITAL IMAGES," filed Feb. 2, 2019, which, in turn, is a continuation of, and claims priority to U.S. patent application Ser. No. 15/636,324, titled "SYSTEMS AND METHODS FOR CAPTURING DIGITAL IMAGES," filed Jun. 28, 2017, which, in turn, is a continuation of and claims priority to U.S. patent application Ser. No. 15/201,283, titled "SYSTEMS AND METHODS FOR CAPTURING DIGITAL IMAGES," filed Jul. 1, 2016, granted on Nov. 14, 2017 as U.S. Pat. No. 9,819,849. The foregoing applications and/or patents are herein incorporated by reference in their entirety for all purposes.

This application is related to the following which are each being incorporated herein by reference in their entirety for all purposes: U.S. patent application Ser. No. 14/823,993, entitled "IMAGE SENSOR APPARATUS AND METHOD FOR OBTAINING MULTIPLE EXPOSURES WITH ZERO INTERFRAME TIME," filed Aug. 11, 2015, which in turn claims priority to U.S. patent application Ser. No. 14/534,079, entitled "IMAGE SENSOR APPARATUS AND METHOD FOR OBTAINING MULTIPLE EXPOSURES WITH ZERO INTERFRAME TIME," filed Nov. 5, 2014; U.S. patent application Ser. No. 14/568,045, entitled "COLOR BALANCE IN DIGITAL PHOTOGRAPHY," filed on Dec. 11, 2014 which in turn is a continuation of and claims priority to U.S. patent application Ser. No. 13/573,252, now U.S. Pat. No. 8,976,264, entitled "COLOR BALANCE IN DIGITAL PHOTOGRAPHY," filed Sep. 4, 2012; U.S. patent application Ser. No. 14/534,068, entitled "SYSTEMS AND METHODS FOR HIGH-DYNAMIC RANGE IMAGES," filed on Nov. 5, 2014; U.S. patent application Ser. No. 14/534,089, entitled "IMAGE SENSOR APPARATUS AND METHOD FOR SIMULTANEOUSLY CAPTURING MULTIPLE IMAGES," filed Nov. 5, 2014; U.S. patent application Ser. No. 14/535,274, entitled "IMAGE SENSOR APPARATUS AND METHOD FOR SIMULTANEOUSLY CAPTURING FLASH AND AMBIENT ILLUMINATED IMAGES," filed Nov. 6, 2014; U.S. patent application Ser. No. 14/535,279, entitled "IMAGE SENSOR APPARATUS AND METHOD FOR OBTAINING LOW-NOISE, HIGH-SPEED CAPTURES OF A PHOTOGRAPHIC SCENE" filed Nov. 6, 2014; U.S. patent application Ser. No. 14/535,282, entitled "SYSTEMS AND METHODS FOR PERFORMING OPERATIONS ON PIXEL DATA" filed Nov. 6, 2014; U.S. patent application Ser. No. 14/536,524, entitled "SYSTEMS AND METHODS FOR GENERATING A HIGH-DYNAMIC RANGE (HDR) PIXEL STREAM," filed Nov. 7, 2014; and U.S. patent application Ser. No. 14/702,549, entitled "SYSTEMS AND METHODS FOR GENERATING A DIGITAL IMAGE," filed May 1, 2015.

This application is related to the following which are each incorporated herein by reference in their entirety for all purposes: U.S. patent application Ser. No. 13/999,678, filed Mar. 14, 2014, entitled "SYSTEMS AND METHODS FOR A DIGITAL IMAGE SENSOR"; and U.S. patent application Ser. No. 14/178,305, filed Feb. 12, 2014, entitled "SYSTEM AND METHOD FOR GENERATING A DIGITAL IMAGE."

FIELD OF THE INVENTION

Embodiments of the present invention relate generally to image processing, and more specifically to systems and methods for capturing digital images.

BACKGROUND

For a traditional camera module, higher sensitivity exposures are typically implemented using higher analog gain. In general, however, more analog gain results in more image noise. Consequently, digital images requiring higher sensitivity exposures generally exhibit more noise, which typically degrades image quality. Conventional digital image processing techniques may reduce certain forms of noise in a digital image. However, such techniques may degrade image quality by eliminating desirable texture and fine details in an image that convey actual scene information. Furthermore, conventional techniques may be computationally too intensive, for efficient implementation on mobile devices.

As the foregoing illustrates, there is a need for addressing this and/or other related issues associated with the prior art.

SUMMARY

A system, method, and computer program product are provided for capturing digital images. In use, an ambient image comprising a plurality of ambient pixels and a flash image comprising a plurality of flash pixels is captured, via a camera module. Next, at least one de-noised pixel based on the ambient image is generated. Additionally, a resulting image is generated by combining the at least one de-noised pixel and a corresponding flash pixel. Additional systems, methods, and computer program products are also presented.

DETAILED DESCRIPTION

Figure 1:
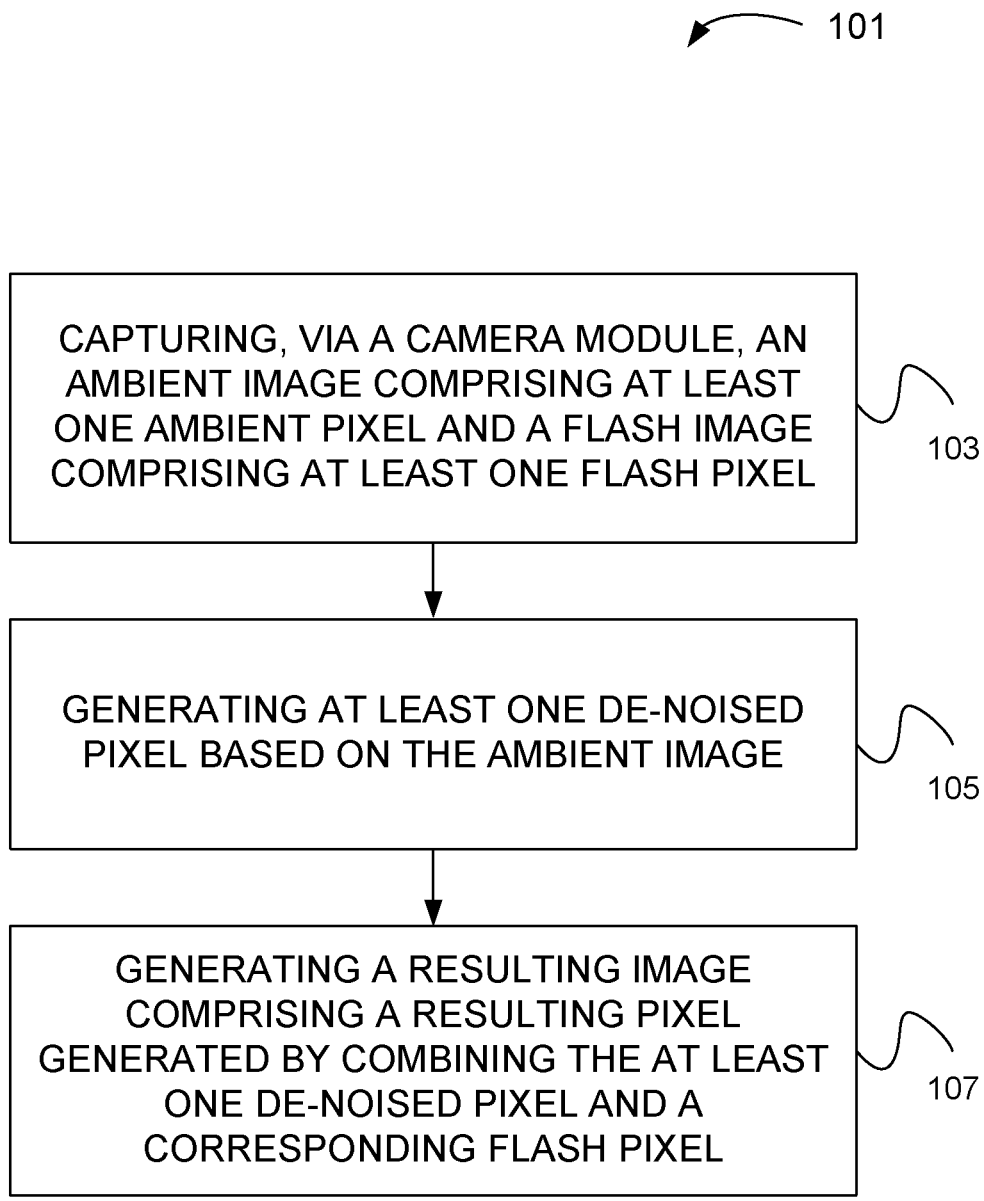
FIG. 1 illustrates an exemplary method for generating a de-noised pixel, in accordance with one possible embodiment.

Embodiments disclosed herein allow a photographic device to reduce noise associated with a captured image of a photographic scene. In one embodiment, two images are merged into one image (a merged image) having lower overall noise than either of the two images. In another embodiment, one image is processed to reduce noise associated with the one image. In one embodiment, the photographic device is configured to capture a first image and a second image of the same scene. The first image is captured with a flash illuminator device enabled, and the second image may be captured with the flash illuminator device either disabled completely or enabled to generate less light relative to that associated with capturing the first image. In the context of the present description, the first image may be referred to herein as a flash image and the second image may be referred to herein as an ambient image.

In certain embodiments, the first image may be captured prior to the second image in time sequence. In other embodiments, the second image may be captured prior to the first image in time sequence. In certain embodiments, the first image is captured by a first camera module and the second image is captured by a second, different camera module. In certain other embodiments, the first image is generated by combining two or more images that are captured by a first camera module, and the second image is generated by combining two or more images that are captured by a second camera module. In yet other embodiments, the first image is generated by combining two or more images, each captured by different corresponding camera modules; in related embodiments, the second image is generated by combining two or more images, each captured by the camera modules.

The first image may be captured according to a first set of exposure parameters and the second image may be captured according to a second set of exposure parameters. Each set of exposure parameters may include one or more of: exposure time, exposure sensitivity (ISO value), and lens aperture. Exposure parameters for a flash image may further include flash intensity, flash duration, flash color, or a combination thereof. The exposure parameters may also include a white balance, which may be determined according to a measured white balance for the scene, according to a known or measured white balance for the flash illuminator device, or a combination thereof. The measured white balance for the scene may be determined according to any technically feasible technique, such as estimating a gray world white balance, estimating illuminator white balance within the scene, and so forth. A capture process includes capturing the first image and the second image, and any associated images from which the first image and the second image are generated. The capture process may include a metering process to generate each set of exposure parameters. In one embodiment, the metering process is performed prior to the capture process and includes at least one ambient metering process and at least one flash metering process.

The metering process may be performed to determine one or more of the exposure parameters such that an exposure goal is satisfied. A sequential set of metering images may be captured and analyzed for comparison against the exposure goal to determine the exposure parameters, with each successive metering image in the set of metering images captured according to a refined approximation of the exposure parameters until the exposure goal is adequately satisfied. In a live view implementation, refinement of exposure may continuously accommodate changes to scene lighting prior to a user taking a picture. A first exemplary exposure goal for a captured image is for the captured image to exhibit an intensity histogram having a median intensity value that is substantially half way between intensity extremes. For example, in a system where image intensity ranges from 0.0 to 1.0, then exposure parameters that cause an image to exhibit a histogram with a median of approximately 0.50 would satisfy the exposure goal. This first exemplary exposure goal is suitable for capturing certain ambient images. A second exemplary exposure goal may be specified to bound a maximum portion or number of poorly-exposed (e.g., over-exposed or under-exposed) pixels. Satisfying the above first and second exposure goals simultaneously may require a modified first exposure goal such that the median intensity goal may specify a range (e.g., 0.45 to 0.55) rather than a fixed value (e.g. 0.50).

In one embodiment, a first metering process is performed for the first image and a second metering process is being performed for the second image. The first metering process may operate according to different constraints than the second metering process. For example, the ambient image may be metered to achieve a median intensity of approximately 0.50, while the flash image may be metered to bound the portion of over-exposed pixels to less than a specified portion of image pixels. Alternatively, the flash image may be metered to bound the portion of over-exposed pixels additional to already over-exposed pixels in the ambient image to less than a specified portion of image pixels. In other words, the flash image may be metered to avoid increasing more than a specified portion of additional over-exposed pixels compared to the ambient image. In one embodiment, the specified portion is defined herein to be one percent of pixels for a given image. In other embodiments, the specified portion may be more than one percent or less than one percent of image pixels.

Enabling the flash illuminator device may cause flash reflection, such as specular reflection, on surfaces that are nearly perpendicular to illumination generated by the flash illuminator device, leading to locally over-exposed pixels within a reflection region. To reduce over-exposure due to flash reflection, the flash illuminator device may be enabled to sweep or otherwise vary intensity over a sequence of metering images, with different metering images captured using a different flash intensity. Reflection regions can be identified in the different metering images as over-exposed regions that grow or shrink based on flash intensity, but with an over-exposed central region that remains over-exposed over the different flash intensities. Over-exposed central regions may be masked out or excluded from consideration for exposure. Furthermore, regions that remain under-exposed or consistently-exposed over different flash intensities may also be excluded from consideration for exposure. In one embodiment, an exposure histogram is generated for each metering image using pixels within the metering image that are not excluded from consideration for exposure. In certain embodiments, the exposure histogram is an intensity histogram generated from pixel intensity values. Other technically feasible exposure histograms may also be implemented without departing the scope of various embodiments. Multiple metering images are captured with varying exposure parameters and corresponding exposure histograms are generated from the metering images. Based on the exposure histograms, exposure parameters are identified or estimated to best satisfy an exposure goal. In one embodiment, the exposure goal is that the exposure histogram has a median intensity value that is substantially half way between intensity extremes. One or more pixels may be excluded from consideration in the histogram as described above. This and related embodiments allow the capture of a flash image with appropriately illuminated foreground subjects. More generally, exposure parameters for illuminated foreground subjects are determined without compromising between exposure for the foreground and exposure for the background regions, while a separately exposed ambient image may be captured to provide data for appropriately exposed background regions and other regions insignificantly hit by the flash illuminator device. In one embodiment, In one embodiment, exposure parameters for an ambient image and exposure parameters for a flash image are determined before the ambient image is captured and before the flash image is captured. For example, to capture an ambient image and a flash image, an ambient metering process and a flash metering process are first performed to generate exposure parameters for capturing an ambient image and, exposure parameters for capturing a flash image. The ambient metering process and the flash metering process may be performed in either order, according to specific implementation requirements, if any. After the ambient metering process and the flash metering process have both completed, the ambient image and the flash image are captured. The ambient image and the flash image may be captured in any order; however, human factors generally favor capturing the flash image last because people tend to hold a pose only until they see a flash. By completing the metering process for both the ambient image and the flash image prior to capturing the ambient image and the flash image, any delay between the capture times for the ambient image and the flash image can be essentially eliminated.

In certain embodiments, a camera module used to capture a flash image incorporates an image sensor configured to generate two or more exposures of the same captured image. In one embodiment, the two or more exposures are generated by performing analog-to-digital conversion on analog pixel values within the image sensor pixel for the captured image according to two or more different analog gain values. In another embodiment, the two or more exposures are generated by performing concurrent sampling into two or more different analog storage planes within the image sensor. The two or more exposures may be generated using different sensitivities for each analog storage plane or different equivalent exposure times for each analog storage plane.

An analog storage plane comprises a two-dimensional array of analog storage elements, each configured to store an analog value, such as a voltage value. At least one analog storage element should be configured to store an analog value for each color channel of each pixel of the image sensor. Two analog storage planes can coexist within the same image sensor, wherein each of the two analog storage planes provides a different analog storage element for the same color channel of each pixel. In one embodiment, each analog storage element comprises a capacitor configured to integrate current from a corresponding electro-optical conversion structure, such as a photodiode. An image sensor with two analog storage planes can capture and concurrently store two different images in analog form. The two different images may be captured sequentially or at least partially concurrently. In one embodiment, an ambient image is captured within one analog storage plane and a flash image is captured in a different analog storage plane. Each analog storage plane is sampled by an analog-to-digital converter to generate a digital representation of an image stored as analog values within the analog storage plane.

In certain embodiments, an ambient metering process is performed to determine ambient exposure parameters for an ambient image. In addition to the ambient metering process, a flash metering process is performed to determine flash exposure parameters for a flash image. Having determined both the ambient exposure parameters and the flash exposure parameters, the photographic device captures an ambient image according to the ambient exposure parameters, and a flash image according to the flash exposure parameters. This specific sequence comprising: first metering for the ambient image and the flash image, followed by capturing the ambient image and the flash image may advantageously reduce an inter-frame time between the ambient image and the flash image by scheduling the relatively time-consuming steps associated with each metering process to be performed prior to time-critical sequential image capture steps. In one embodiment, the ambient image and the flash image are stored in different analog storage planes within a multi-capture image sensor.

In one embodiment, the ambient metering process is performed prior to the flash metering process, and the flash metering process is constrained to determining an exposure time that is less than or equal to the exposure time determined by the ambient metering process. Furthermore, the flash metering process may be constrained to determining an ISO value that is less than or equal to the ISO value determined by the ambient metering process. Together, these constraints ensure that regions of the flash image primarily lit by ambient illumination will be less intense than those lit by flash illumination, thereby generally isolating the relative effect of flash illumination in a merged image generated by combining the flash image and the ambient image. The flash metering process may vary flash duration, flash intensity, flash color, or a combination thereof, to determine flash exposure parameters that satisfy exposure goals for the flash image, such as bounding the portion or number of over-exposed pixels within the flash image.

In one embodiment, a designated image (e.g., the first image, the second image, or a combination thereof) is processed according to de-noising techniques to generate a de-noised image comprising de-noised pixels. A de-noised pixel is defined herein as a pixel selected from a designated image at a selected pixel location and processed according to a de-noising technique. The de-noised image may be stored (materialized) in a data buffer for further processing or storage within a file system. Alternatively, de-noised pixels comprising the de-noised image may be processed further before being stored in a data buffer or file system.

In one embodiment, a pixel noise estimate may be calculated and used to determine a de-noising weight for an associated pixel in a designated image to generate a corresponding de-noised pixel in a de-noised image. A given de-noising weight quantifies an amount by which a corresponding pixel is made to appear visually similar to a surrounding neighborhood of pixels, thereby reducing perceived noise associated with the pixel. A high de-noising weight indicates that a pixel should appear more like the surrounding neighborhood of pixels, while a low de-noising weight allows a pixel to remain visually distinct (e.g., in color and intensity) relative to the surrounding neighborhood of pixels. In one embodiment, de-noising weight is represented as a numeric value between 0.0 and 1.0, with higher de-noising weights indicated with values closer to 1.0 and lower de-noising weights indicated by values closer to 0.0. Other technically feasible representations of a de-noising weight may also be implemented without departing the scope of various embodiments.

In one embodiment, the designated image is an ambient image and de-noising produces a de-noised ambient image. The captured image of the photographic scene may be generated by combining the flash image with the de-noised ambient image. The flash image may be combined with the de-noised ambient image by blending the two images. In certain embodiments, blending the two images may be performed according to a mix function having a mix function weight that is calculated according to a blend surface described below in FIG. 3. Alternatively, a different or similar blend surface may implement the mix function. The blend surface of FIG. 3 may be used in calculating an estimated noise value for a pixel (pixel noise estimate). Alternatively, a different or similar blend surface may be used in calculating an estimated noise value for a pixel.

In another embodiment, a combined image generated by combining the flash image and the ambient image is de-noised. Any technically feasible technique may be implemented to generate the combined image, such as blending according to the blend surface of FIG. 3.

In yet another embodiment, an input image is de-noised according to the techniques described herein. The input image may be the flash image, the ambient image, or an arbitrary image such as a previously generated or previously captured image.

Although certain aspects of the disclosed de-noising techniques are described in conjunction with de-noising a specific type or source of image, such as an ambient image, the techniques may be applied to de-noising other, arbitrary images. For example, in another embodiment, the designated image may be generated by combining the flash image with the ambient image (e.g. using a mix function between each flash pixel and each corresponding ambient pixel, and mix weights from the blend surface of FIG. 3). A captured image of the photographic scene may be generated by de-noising the designated image. In other embodiments, the designated image may be captured by a first camera module and de-noised in conjunction with a second image, captured by a second module (with or without flash illumination), using a sequential or substantially simultaneous capture for both camera modules. In multi-camera implementations, one or more images may be a designated image to be de-noised. In still other embodiments, the designated image may include a generated HDR image or an image within an image stack, which may be associated with an HDR image. In yet other embodiments, the designated image may comprise one or more images generated by a multi-capture image sensor configured to capture two or more analog planes (e.g., with and without flash, higher and lower ISO, or a combination thereof) of the same photographic scene. Certain embodiments implement a complete set of techniques taught herein, however other embodiments may implement a subset of these techniques. For example, certain subsets may be implemented to beneficially operate on one image rather than two images.

Each pixel in the de-noised image may be generated by performing a de-noising operation on the pixel. In one embodiment, the de-noising operation comprises blurring the pixel with neighboring pixels according to a corresponding pixel noise estimate. A pixel noise estimate threshold may be applied so that pixels with a sufficiently low estimated noise are not de-noised (not blurred). As estimated noise increases, blurring correspondingly increases according to a de-noise response function, which may be linear or non-linear. Noise in a given image may vary over the image and only those pixels with sufficiently large estimated noise are subjected to de-noising, leaving pixels with sufficiently less estimated noise untouched. In other words, only regions (e.g., pixels or groups of pixels) of the image assessed to be sufficiently noisy are subjected to a de-noising effect, while regions of the image that are not assessed to be sufficiently noisy are not subjected to de-noising and remain substantially unaltered. Determining that a pixel is sufficiently noisy may be implemented as a comparison operation of estimated noise against a quantitative noise threshold, which may be adjusted for a given implementation to correlate with a threshold for visually discernible noise. In a practical setting, a flash image provides foreground regions with low noise, while background regions tend to be out of focus and naturally blurry. Consequently, blurring out chromatic noise (commonly appears in an image as off-color speckles) in pixels with high estimated noise causes those regions to appear much more natural.

FIG. 1 illustrates an exemplary method 101 for generating a de-noised pixel, in accordance with one possible embodiment. As an option, the exemplary method 101 may be implemented in the context of the details of any of the Figures. Of course, however, the exemplary method 101 may be carried out in any desired environment.

As shown, an ambient image comprising a plurality of ambient pixels and a flash image comprising a plurality of flash pixels is captured, via a camera module. See operation 103. Next, at least one de-noised pixel based on the ambient image is generated. See operation 105. Lastly, a resulting image is generated comprising a resulting pixel generated by combining the at least one de-noised pixel and a corresponding flash pixel. See operation 107.

In one embodiment, a flash image may be captured while an associated strobe unit is enabled. In the context of the present description, a de-noised pixel includes a pixel selected from a designated image at a selected pixel location that is processed according to a de-noising technique. Additionally, in the context of the present description, a noise estimate value includes a calculated and estimated noise value for a pixel.

Figure 1A:
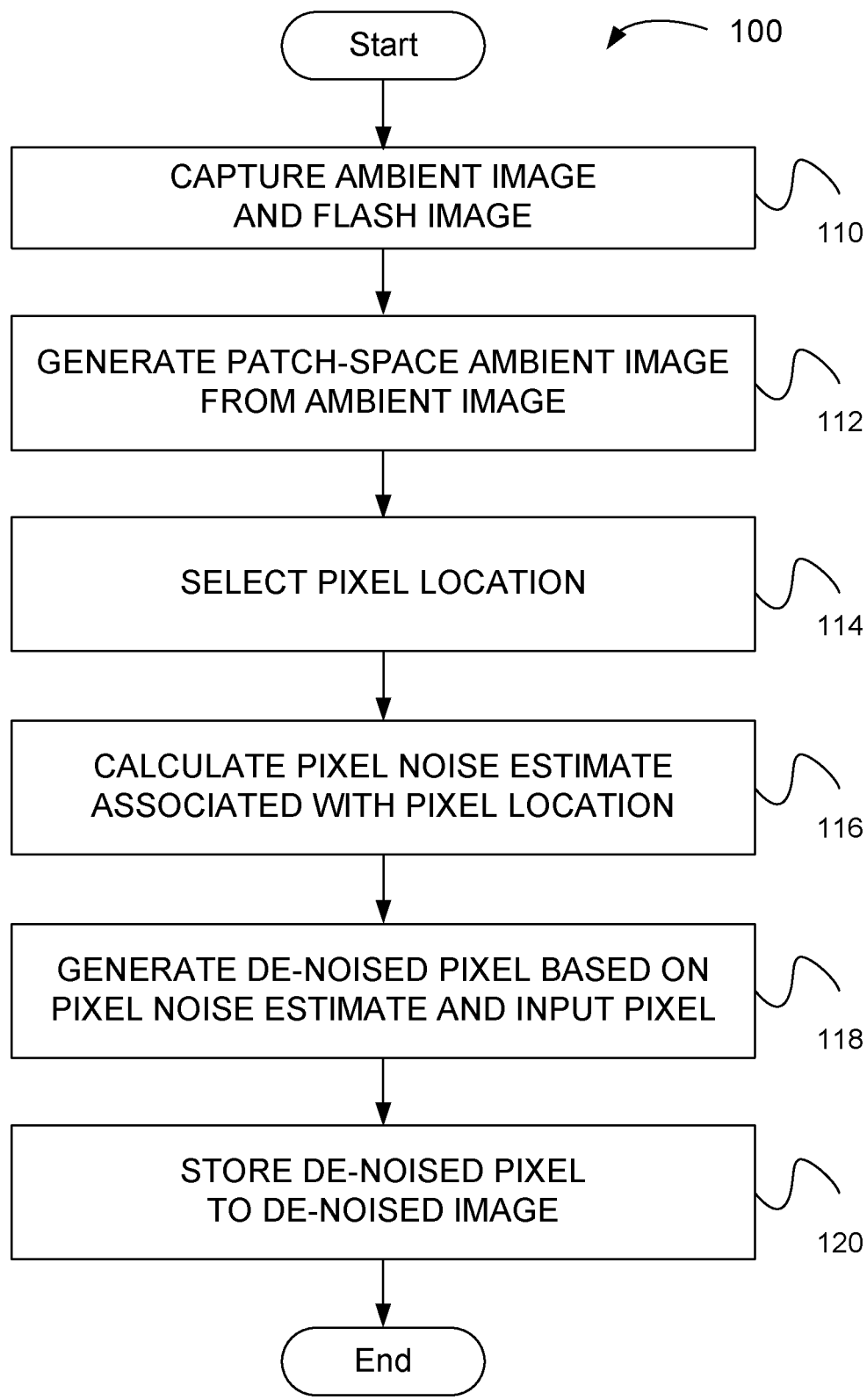
FIG. 1A illustrates a method for generating a de-noised pixel comprising a digital image, according to one embodiment of the present invention.
Figure 4A:
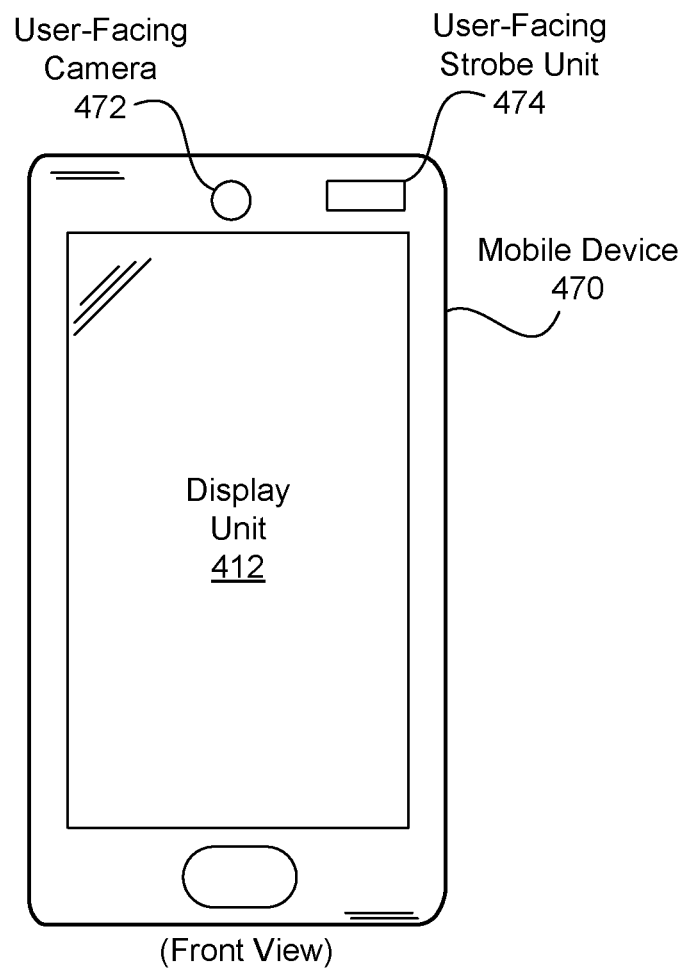
FIG. 4A illustrates a front view of a mobile device comprising a display unit, according to one embodiment of the present invention.
Figure 4B:
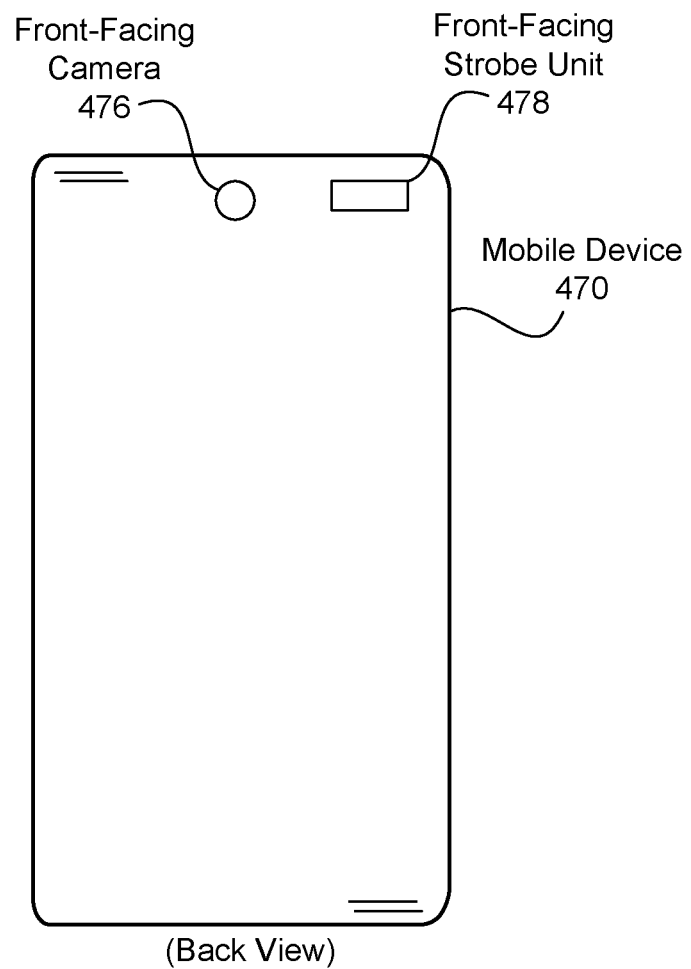
FIG. 4B illustrates a back view of a mobile device comprising a front-facing camera and front-facing strobe unit, according to one embodiment of the present invention.
Figure 4C:
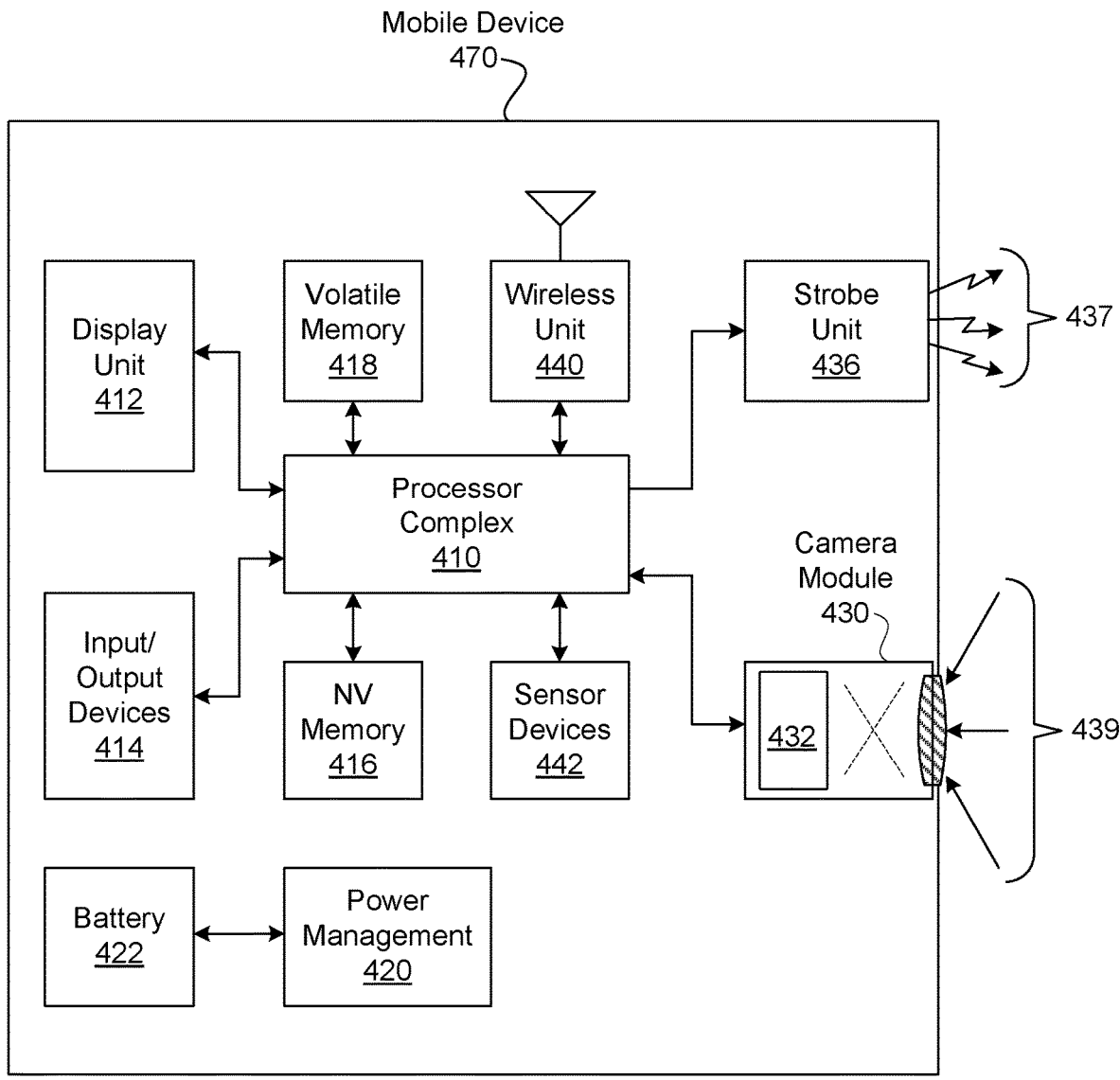
FIG. 4C illustrates a block diagram of a mobile device, configured to implement one or more aspects of the present invention.

FIG. 1A illustrates a method 100 for generating a de-noised pixel comprising a digital image, according to one embodiment of the present invention. Although method 100 is described in conjunction with the systems of FIGS. 4A-4C, persons of ordinary skill in the art will understand that any imaging system that performs method 100 is within the scope and spirit of embodiments of the present invention. In one embodiment, a mobile device, such as mobile device 470 of FIGS. 4A-4C, is configured to perform method 100 to generate a de-noised pixel within a de-noised image. In certain implementations, a graphics processing unit (GPU) within the mobile device is configured to perform method 100. Alternatively, a digital signal processing (DSP) unit or digital image processing (DIP) unit may be implemented within the mobile device and configured to perform method 100. Steps 114 through 120 may be performed for each pixel comprising the de-noised image.

Method 100 begins at step 110, where the mobile device captures an ambient image and a flash image. In one embodiment, the ambient image comprises a two-dimensional array of ambient pixels and the flash image comprises a two-dimensional array of flash pixels. Furthermore, the de-noised image comprises a two-dimensional array of de-noised pixels. In certain embodiments, the ambient image, the flash image, and the de-noised image have substantially identical row and column dimensions (e.g. resolution). Additionally, in one embodiment, the ambient image may comprise a three-dimensional array of ambient pixels and the flash image may comprise a three-dimensional array of flash pixels.

In some embodiments, the ambient image and the flash image are aligned in an image alignment operation in step 110. For example, the ambient image may comprise an aligned version of an unaligned ambient image captured in conjunction with the flash image, wherein the flash image serves as an alignment reference. In another example, the flash image may comprise an aligned version of an unaligned flash image captured in conjunction with the ambient image, wherein the ambient image serves as an alignment reference. Alternatively, both the ambient image and the flash image may be co-aligned so that neither serves as the only alignment reference. Aligning the ambient image and the flash image may be performed using any technically feasible technique. In certain embodiments, the ambient image and the flash image are captured in rapid succession (e.g., with an inter-frame time of less than 50 milliseconds) within an image sensor configured to capture the two images with reduced content movement between the two images. Here, the flash image and the ambient image may still undergo alignment to fine-tune alignment, should fine-tuning be deemed necessary either by static design or by dynamic determination that alignment should be performed. In one embodiment, capturing the ambient image and the flash image may proceed according to steps 170-178 of method 106, described in FIG. 1D.

At step 112, the mobile device generates a patch-space ambient image from the ambient image. In one embodiment, the patch-space ambient image is a lower-resolution representation of the ambient image. For example, each pixel of the patch-space ambient image may be generated from an N×N (e.g., N=2, N=4, N=8, etc.) patch of pixels in the ambient image. In the case of N=4, each patch represents a 4-pixel by 4-pixel region, and the patch-space ambient image consequently has one fourth the resolution in each dimension of the ambient image. Any technically feasible technique may be used to generate pixels in the patch-space ambient image. For example, a simple or weighted average of corresponding 4x4 patch of ambient image pixels may be used to generate each pixel in the patch-space ambient image. The patch-space ambient image may be generated and materialized (e.g., explicitly stored in a drawing surface or texture map surface), or, alternatively, pixels comprising the patch-space ambient image may be generated when needed.

At step 114, the mobile device selects a pixel location corresponding to an ambient pixel within the ambient image and a flash pixel within the flash image. The pixel location may further correspond to a de-noised pixel within the de-noised image. In certain embodiments, the pixel location comprises two normalized coordinates, each ranging from 0.0 to 1.0, which specify a location within an associated image. At step 116, the mobile device calculates a pixel noise estimate associated with the pixel location. In one embodiment, the pixel noise estimate is calculated as a function of an intensity for the ambient pixel, an ISO value (photographic sensitivity value) associated with the ambient pixel (e.g. from ambient image metadata), and an intensity for the flash pixel. An ISO value may be selected in an exposure process for a given photographic scene and used to determine an analog gain applied to analog samples from an image sensor to generate amplified analog samples, which are then converted to corresponding digital values. In one embodiment, step 116 is implemented according to method 102, described in greater detail below in FIG. 1B. At step 118, the mobile device generates a de-noised pixel (e.g., a de-noised ambient pixel or a de-noised pixel generated by merging an ambient pixel and a flash pixel) based on the pixel noise estimate and an input pixel. In one embodiment, the input pixel is the ambient pixel. In another embodiment, the input pixel is generated by combining an ambient pixel and a flash pixel. In one embodiment, step 118 is implemented according to method 104, described in greater detail below in FIG. 1C.

At step 120, the mobile device stores the de-noised pixel to a de-noised image. In one embodiment, the de-noised pixel may be stored in a random access memory device, configured to implement an image buffer or texture map. In another embodiment, the de-noised pixel may be stored in a file system, implemented using non-volatile memory devices such as flash memory devices. In certain embodiments, the de-noised pixel is stored in a de-noised image along with a plurality of other de-noised pixels, also generated according to method 100. In one embodiment, the de-noised pixel is generated based on the ambient pixel and the de-noised pixel is combined with the flash pixel to generate a resulting output pixel. A plurality of output pixels generated in this way may be stored in an output image, which may be displayed to a user.

In certain embodiments, steps 114 through 120 are performed for each pixel comprising the de-noised image. The selection process for a given pixel may comprise selecting a new pixel location along a row dimension and the column dimension in a rasterization pattern until each pixel location has been selected and corresponding pixels in the de-noised image have been generated. In certain embodiments, a plurality of pixels is selected for concurrent processing and steps 116 through 120 are performed concurrently on different selected pixels. For example, in a graphics processing unit, a rasterization unit may generate a plurality of fragments (select a plurality of pixel locations) associated with different corresponding pixel locations, and steps 116 through 120 are performed concurrently on the plurality of fragments to generate associated pixels.

Figure 1B:
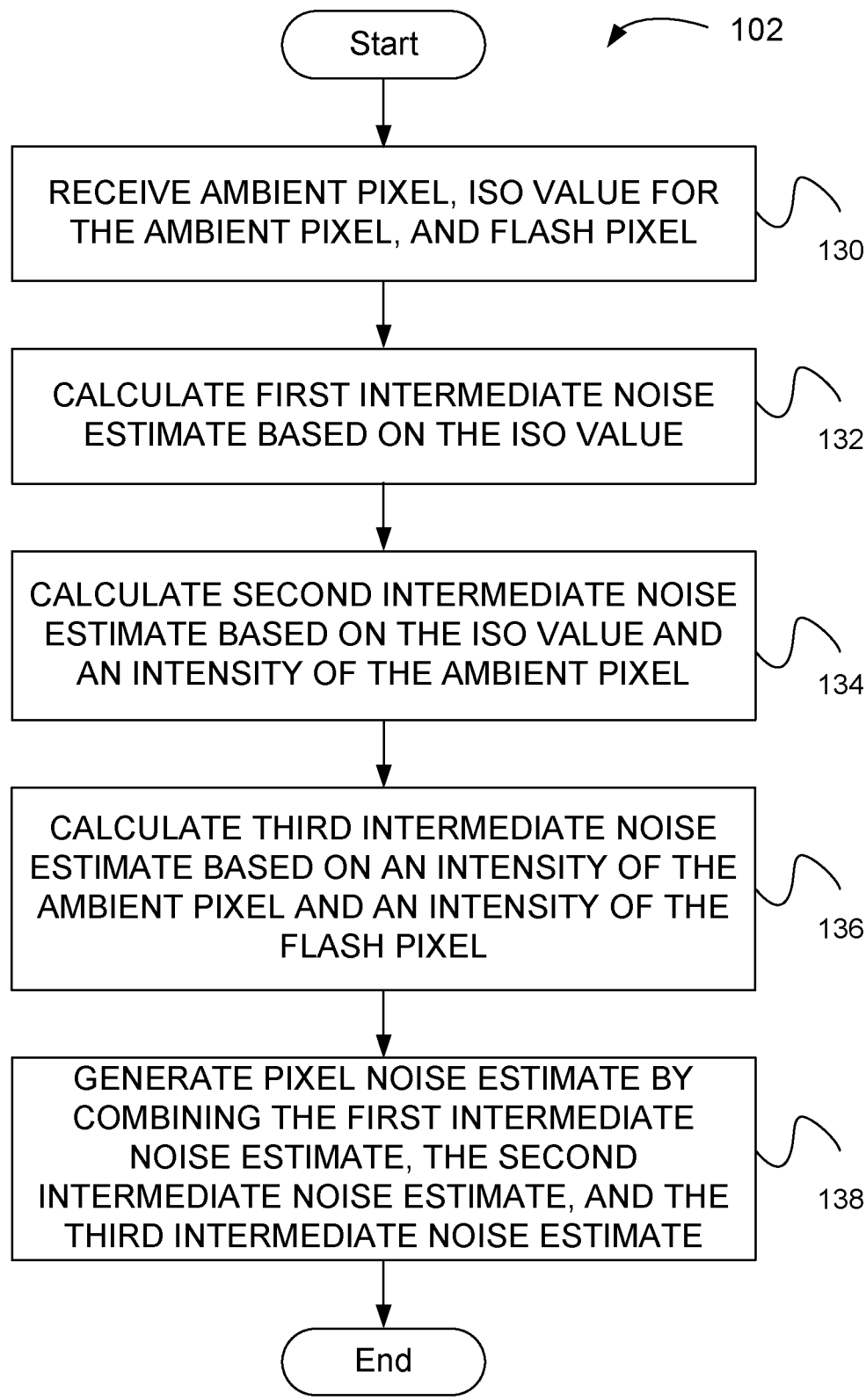
FIG. 1B illustrates a method for estimating noise for a pixel within a digital image, according to one embodiment of the present invention.

FIG. 1B illustrates a method 102 for estimating noise for a pixel within a digital image, according to one embodiment of the present invention. Although method 102 is described in conjunction with the systems of FIGS. 4A-4C, persons of ordinary skill in the art will understand that any image processing system that performs method 102 is within the scope and spirit of embodiments of the present invention. In one embodiment, a mobile device, such as mobile device 470 of FIGS. 4A-4C, is configured to perform method 102 to estimate noise for a pixel within a digital image. In certain implementations, a processing unit, such as a graphics processing unit (GPU) within the mobile device is configured to perform method 102. Alternatively, a digital signal processing (DSP) unit or digital image processing (DIP) unit may be implemented within the mobile device and configured to perform method 102. Method 102 may be performed for each pixel comprising the de-noised image of FIG. 1A. While embodiments discussed herein are described in conjunction with an ambient pixel, persons of ordinary skill in the art will understand that a noise estimate may be calculated for any pixel in accordance with method 102.

Method 102 begins at step 130, where a processing unit within the mobile device receives an ambient pixel, an ISO value for the ambient pixel, and a flash pixel. The ambient pixel may be received from a memory unit configured to store a captured (or aligned) ambient image, the ISO value may be stored in the memory unit as metadata associated with the ambient image, and the flash pixel may be from a memory unit configured to store a captured flash image.

At step 132, the processing unit calculates a first intermediate noise estimate (isoPsi) based on the ISO value. The first intermediate noise estimate may be calculated using the OpenGL code shown in Table 1. In this code, isoPsi ranges from a value of 0 (no noise) to a value of 1 (high noise). An image ISO value, given as ambientIso below, ranges within the standard range definition for photographic ISO values (100, 200, and so forth). In general, the isoPsi noise estimate increases with increasing ISO values. An ISO value floor, given at L1 in the OpenGL code of Table 1, may define an ISO value below which image noise is considered insignificant, indicating no de-noising should be applied. An ISO ceiling, given at H1, may define an ISO value above which image noise is considered highly significant and de-noising should be applied in accordance with other factors. In one embodiment, L1 is equal to an ISO value of 250 and H1 is equal to an ISO value of 350. In other embodiments, L1 and H1 may be assigned different ISO values, based on noise performance of an associated camera module. As is known in the art, a smoothstep function receives a "left edge" (L1), a "right edge" (H1), and input value (ambientIso). The smoothstep function generates an output value of zero (0.0) for input values below the left edge value, an output value of one (1.0) for input values above the right edge, and an smoothly interpolated output value for input values between the left edge and the right edge.

TABLE 1 float isoPsi = smoothstep(L1, H1, ambientIso);

At step 134, the processing unit calculates a second intermediate noise estimate (intPsi) based on the ISO value and an intensity of the ambient pixel. The second intermediate noise estimate may be calculated using the OpenGL code shown in Table 2. In this code intPsi ranges from a value of 0 (no noise) to a value of 1 (high noise). In general, the intPsi noise estimate increases with increasing ISO values and decreases with increasing ambient intensity values, given as aInt. In one embodiment, L2 is equal to an ISO value of 800, H2 is equal to an ISO value of 1600, C1 is equal to a value of 0.4, C2 is equal to a value of 0.7, and C3 is equal to a value of 0.1. In other embodiments, L2, H2, C1, C2, and C3 may be assigned different values, based on noise performance of an associated camera module. Furthermore, while a constant value of 1.0 is specified in the code, a different value may be implemented as appropriate to the camera module, numeric range of intensity values, or both.

TABLE 2 float H3 = C1 + (C2 * smoothstep(L2., H2., ambientIso));
float L3 = H3 − C3;
float intPsi = 1.0 − smoothstep(L3, H3, aInt);

At step 136, the processing unit calculates a third intermediate noise estimate (alphaPsi) based on an intensity of the ambient pixel and an intensity of the flash pixel. For example, the third intermediate noise estimate may be calculated using the OpenGL code shown in Table 3. In this code alphaPsi ranges from a value of 0 (no noise) to a value of 1 (high noise), and a value for alpha may be calculated according to the discussion of FIG. 3. In general, the value of alpha reflects a contribution of flash intensity versus ambient intensity at a selected pixel location, with a higher value of alpha indicating a higher flash contribution. In one embodiment, L4 is set to 0.4 and H4 is set to 0.5. In other embodiments, L4 and H4 may be assigned different values, based on noise performance of an associated camera module. Furthermore, while a constant value of 1.0 is specified in the code, a different value may be implemented as appropriate to the camera module, numeric range of intensity values, or both. In certain embodiments, alphaPsi is computed directly from a blend surface function configured to incorporate the smoothstep function illustrated in Table 3.

TABLE 3 float alphaPsi = 1.0 − smoothstep(L4, H4, alpha);

At step 138, the processing unit generates an overall pixel noise estimate (Psi) by combining the first intermediate noise estimate, the second intermediate noise estimate, and the third intermediate noise estimate. In other words, the pixel noise estimate is generated based on a pixel ISO value (e.g., for the ambient pixel), an ambient intensity value, and a flash intensity value. The first intermediate noise estimate may be calculated based on the pixel ISO value. The second intermediate noise estimate may be calculated based on the pixel ISO value and the ambient intensity value. The third intermediate noise estimate may be calculated from the ambient intensity value and the flash intensity value. In one embodiment, the combining operation may be performed as an arithmetic multiplication of the three intermediate noise estimates (Psi=isoPsi*intPsi*alphaPsi).

A final pixel noise estimate may be further defined to include additional terms. For example, a user input term received from a UI variable control element (e.g., slider, control knob, swipe gesture, etc.) may be combined (e.g. multiplied) by the pixel noise estimate for all de-noised pixels in the de-noised image to allow a user to control the strength of the de-noising effect on a given image. In another example, image features may be used to generate another noise estimation term, which may be multiplied or otherwise combined by the pixel noise estimate term. For example, if the pixel intersects a sharp edge detected in the image, the noise estimate may be reduced to reduce blurring associated with de-noising. In certain instances some noise along an edge may be preferable to a blurred edge.

Figure 1C:
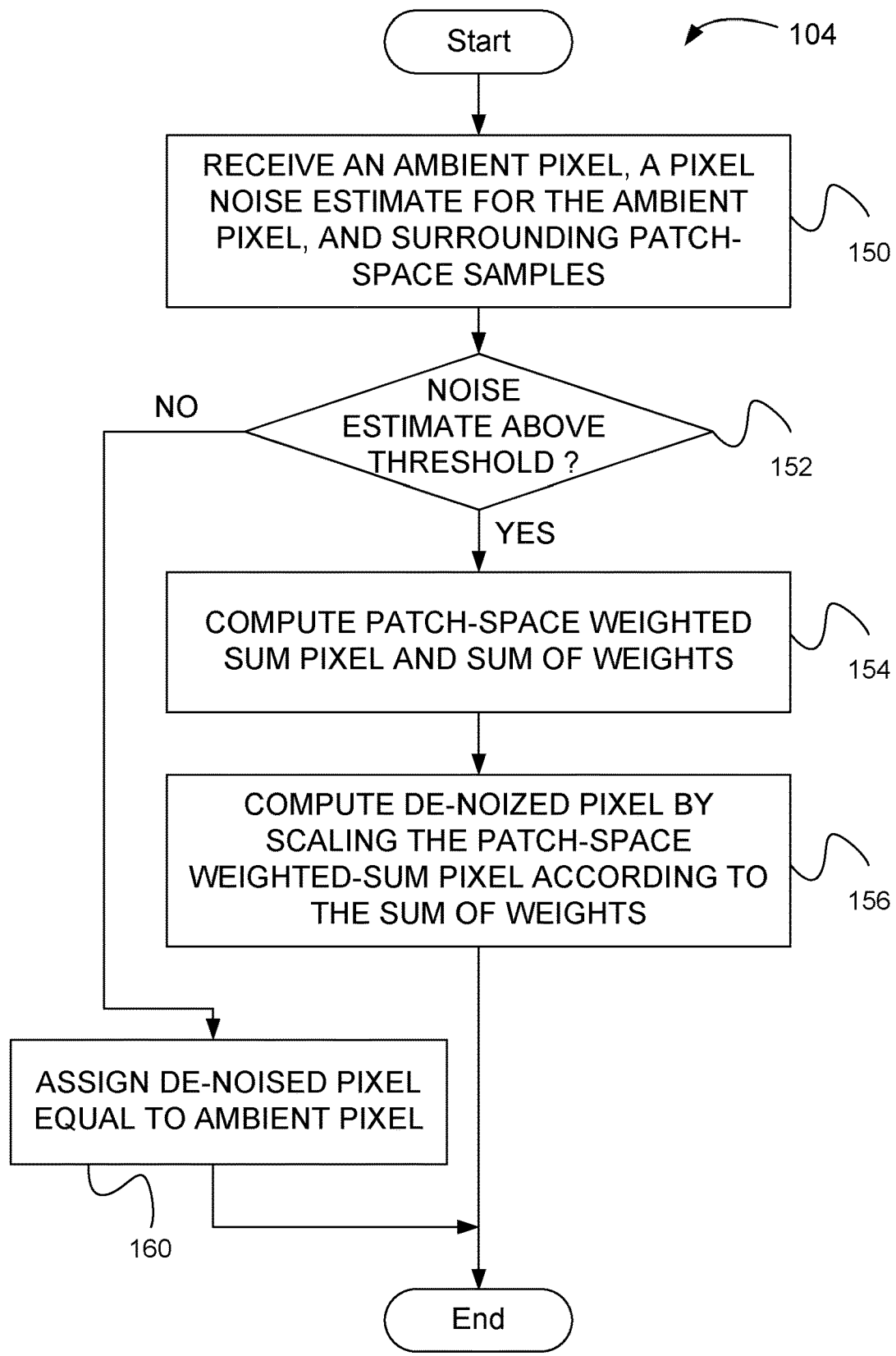
FIG. 1C illustrates a method for generating a de-noised pixel, according to one embodiment of the present invention.

FIG. 1C illustrates a method 104 for generating a de-noised pixel, according to one embodiment of the present invention. Although method 104 is described in conjunction with the systems of FIGS. 4A-4C, persons of ordinary skill in the art will understand that any image processing system that performs method 104 is within the scope and spirit of embodiments of the present invention. In one embodiment, a mobile device, such as mobile device 470 of FIGS. 4A-4C, is configured to perform method 104 to generate a de-noised pixel based on an input (e.g., ambient) pixel, a noise estimate for the input pixel (e.g., as estimated by method 102), and patch-space samples associated with the input pixel. The patch-space samples may comprise a region in patch-space encompassing a coordinate in patch-space that corresponds to a coordinate in pixel space for the input pixel. In certain implementations, a processing unit, such as a graphics processing unit (GPU) within the mobile device is configured to perform method 104. Alternatively, a digital signal processing (DSP) unit or digital image processing (DIP) unit may be implemented within the mobile device and configured to perform method 104. Method 104 may be performed for each pixel comprising the de-noised image. While embodiments discussed herein are described in conjunction with an ambient pixel and an ambient image, persons of ordinary skill in the art will understand that a de-noised pixel may be generated for any type of pixel associated with any type of image in accordance with method 104.

Method 104 begins at step 150, where the processing unit receives an ambient pixel, a pixel noise estimate for the ambient pixel, and a set of surrounding patch-space samples. The pixel noise estimate may be calculated according to method 102. The patch-space samples may be generated using any resolution re-sampling technique.

If, at step 152, the noise estimate is above a predefined or pre-calculated threshold, the method proceeds to step 154, wherein the processing unit computes a patch-space weighted-sum pixel and a sum of weights contributing to the patch-space weighted-sum pixel. At step 156, the processing unit computes a de-noised pixel by scaling the patch space weighted sum pixel by the sum of weights. In one embodiment, the patch-space weighted-sum pixel comprises a vec3 of red, green, and blue components, which is divided by the sum of weights (a scalar). In another embodiment, the patch-space weighted-sum pixel comprises a vec3 of red, green, and blue components, which is multiplied by a reciprocal of the sum of weights. An opacity value of 1.0 may also be assigned to the de-noised pixel to yield a vec4 de-noised pixel. One technique for generating the patch-space weighted-sum pixel is described in greater detail in FIGS. 2D through 2F.

Returning to step 152, if the noise estimate is not above the threshold, then the method proceeds to step 160, where the processing unit assigns the de-noised pixel equal to the input ambient pixel. In one embodiment, the input ambient pixel comprises a vec3 of red, green, and blue components, and assigning comprises assigning corresponding components. An opacity value of 1.0 may also be assigned to the de-noised pixel to yield a vec4 de-noised pixel.

Figure 1D:
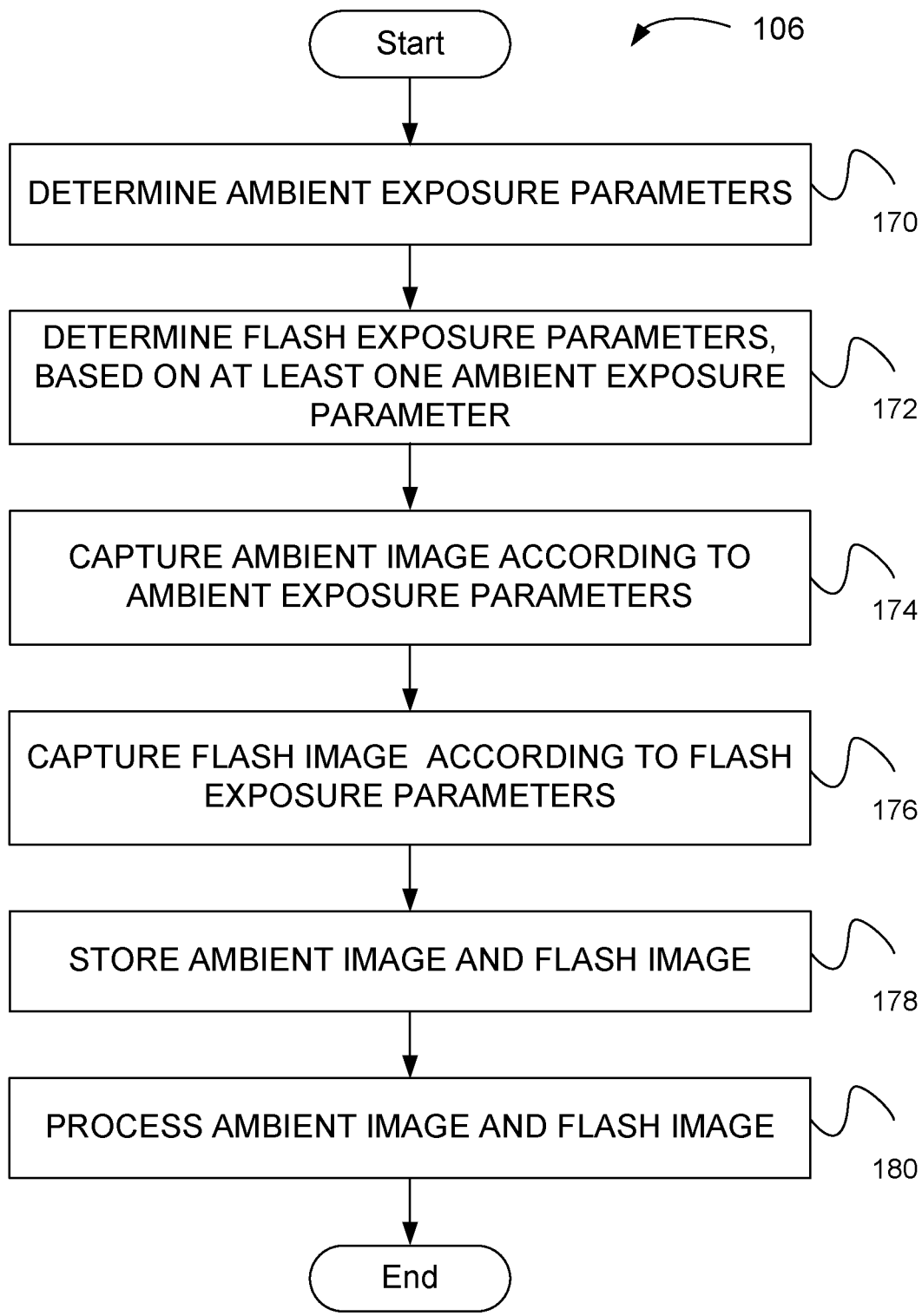
FIG. 1D illustrates a method for capturing an ambient image and a flash image, according to one embodiment of the present invention.

FIG. 1D illustrates a method 106 for capturing an ambient image and a flash image, according to one embodiment of the present invention. Although method 106 is described in conjunction with the systems of FIGS. 4A-4C, persons of ordinary skill in the art will understand that any imaging system that performs method 106 is within the scope and spirit of embodiments of the present invention. In one embodiment, a mobile device, such as mobile device 470 of FIGS. 4A-4C, is configured to perform method 106 to generate an ambient image and a flash image of a photographic scene. In certain implementations, a processor complex within the mobile device controls an associated camera module and strobe unit to perform method 106.

Method 106 begins at step 170, where the mobile device determines ambient exposure parameters for an ambient image of the scene. The ambient exposure parameters may include at least one of: exposure time, exposure sensitivity (ISO value), and lens aperture. The ambient exposure parameters may also include white balance. In one embodiment, step 170 is performed by capturing a sequence of images, each captured by a camera module within the mobile device, wherein each image is captured with a successively refined estimate for the ambient exposure parameters until an ambient exposure goal is satisfied. In step 172, the mobile device determines flash exposure parameters for a flash image of the scene. The flash exposure parameters may include at least one of: exposure time, exposure sensitivity (ISO value), and lens aperture. The flash exposure parameters may also include white balance and flash duration. The flash exposure parameters may be constrained according to at least one ambient exposure parameter. In one embodiment, the flash ISO value is constrained to be equal to or greater than the ambient ISO value, as determined in step 170. In certain embodiments, the flash exposure time is constrained to be equal to or shorter than the ambient exposure time. In one embodiment, step 172 is performed by capturing a sequence of images, each captured by a camera module within the mobile device, with a strobe unit enabled to illuminate the scene. Each image in the sequence of images is captured with a successively refined estimate for the flash exposure parameters until an exposure goal is satisfied. In one embodiment, flash duration, flash intensity, or a combination thereof is adjusted to until a flash exposure goal is satisfied.

In step 174, the mobile device captures an ambient image in accordance with the ambient exposure parameters. In step 176, the mobile device captures a flash image in accordance with the flash exposure parameters. In one embodiment, the ambient image is captured within a first analog storage plane of a multi-capture image sensor and the flash image is captured within a second analog storage plane of the multi-capture image sensor. In step 178, the mobile device stores the ambient image and the flash image within a memory subsystem of the mobile device. The memory subsystem may comprise volatile memory devices (e.g., DRAM chips) or non-volatile memory devices (e.g., flash memory chips).

In step 180, the mobile device processes the ambient image and the flash image. In one embodiment, processing includes combining the ambient image and the flash image to generate a merged image. In another embodiment, processing includes de-noising the ambient image, the merged image, or the flash image. De-noising a given image may proceed according to FIGS. 1A-1C. In certain low-light scenarios, a relatively high ambient ISO value (e.g., ISO 1600 or higher) may be determined necessary to meet one or more ambient exposure goals. The relatively high ambient ISO value may result in increased ambient image noise. A lower flash ISO value may be determined to meet one or more flash exposure goals, which may naturally result in reduced flash image noise in regions of the image substantially lit by flash illumination. Therefore, in certain embodiments, processing may include combining the ambient image and the flash image to generate a merged image, as well as de-noising at least the ambient image or the merged image. Different de-noising techniques may be implemented as appropriate. In one embodiment generating de-noised pixels comprising a designated image (e.g., an ambient image) is performed in accordance with techniques described herein in conjunction with FIGS. 1A-1C, and 2A-3.

In certain embodiments, the ambient image is captured at a lower resolution than the flash image. For example, the ambient image may be captured at one-half the horizontal resolution and one-half the vertical resolution. In such embodiments, reducing resolution of the ambient image has the beneficial effect of reducing overall image noise in the ambient image. In low-light settings, the ambient image may be captured at or near specified sensitivity limits of an image sensor (or camera module including the image sensor), resulting in higher overall image noise than when the image sensor is operating with more available illumination.

When the flash image is combined with the ambient image to generate the merged image, pixel data from the ambient image may be interpolated to provide additional pixels for a higher effective resolution that may be equivalent to the flash image. In the context of embodiments where a lower resolution ambient image is captured, pixels from the lower resolution ambient image may be de-noised to provide further reductions in ambient image noise. Interpolating pixels from the lower resolution ambient image to generate higher resolution ambient pixels may be performed before or after a de-noising operation. In one embodiment, resulting de-noised pixels of the same resolution as the flash image are used to generate the merged image.

In one embodiment, the ambient image is captured at a lower resolution to achieve lower overall image noise at a selected ISO value for the ambient image, and the flash image is captured at a higher resolution and a higher ISO value. With more abundant illumination provided by the flash illuminator on foreground subjects, an ISO value with lower inherent noise (lower ISO value) may be selected for the flash image. In an exemplary capture process, an image sensor (e.g., within a camera module) may be directed to capture the ambient image in a low resolution mode and also capture a flash image in a high resolution mode. In the high resolution mode, the flash image is captured at a native (physical) pixel resolution for the image sensor. In the low resolution mode, intensity or color channel signals from groups of native resolution pixels (e.g. groups of 2×2, 1×2, 2×1, 3×3, 4×4, etc. native resolution pixels) are combined to generate each low resolution pixel. Combining signals from native resolution pixels may be performed at the analog level so that photodiode output current of each color channel of each native resolution pixel is combined into a corresponding analog sample for a color channel sample of a low resolution pixel.

In one embodiment, photodiode currents from photodiodes within a group of native resolution pixels are combined and integrated in capacitors associated with one or more of the photodiodes.

For example, in one mode of operation a group comprises a 2×2 pattern of native resolution pixels. Four photodiode currents are generated by four different photodiodes per color channel (one for each pixel in the 2×2 pattern) are combined and integrated in four corresponding analog storage circuits (one for each pixel in the 2×2 pattern). In one embodiment, four photodiode currents for a red color channel are combined and integrated within four corresponding analog storage circuits (e.g. including a capacitor to integrate current into a voltage). Green and blue color channels may be identically implemented. Such a mode of operation may provide lower overall image noise but lower resolution at an ISO value equivalent to native resolution operation.

In a second mode of operation using a 2×2 pattern of native resolution pixels, the four photodiode currents are combined and integrated in one analog storage circuits residing within one of the native resolution pixels. Such a mode of operation may allow image capture at a higher ISO value with comparable noise to native resolution operation. In the context of one embodiment, this second mode of operation may be selected to provide a higher ISO value that allows a faster shutter speed (shorter exposure time) in low light settings to reduce image blur associated with camera shake.

In certain embodiments, the ambient image is captured by combining and integrating photodiode currents from each color channel into a single intensity value per pixel. The photodiode currents may be combined from color channels associated with one pixel or a group of pixels. In one embodiment, photodiode currents associated with a 2×2 pattern of native resolution pixels are combined and integrated within one analog storage circuits residing within one of the native resolution pixels. These photodiode currents include current from red, green, and blue color channels from the 2×2 pattern of native resolution pixels. Such embodiments are operable in very low light and generate a gray scale ambient image, and may generate either a color flash image or a gray scale flash image. The gray scale ambient image may be generated with an effective sensitivity of almost sixteen (four photographic stops) times the sensitivity of a native resolution color image. In one embodiment, a lower resolution gray scale ambient image is combined with a full resolution color image to generate a merged image. A specific color may be applied to the gray scale ambient image so that ambient illumination appears, for example white/gray, beige, green or amber. Such embodiments may allow an ambient image to be captured using a much shorter (e.g., almost one sixteenth) overall exposure time than conventional techniques. A shorter overall exposure time advantageously reduces motion blur and other motion artifacts leading to a higher-quality ambient image. An associated flash image may then be combined with the ambient image to generate a merged image.

Figure 2A:
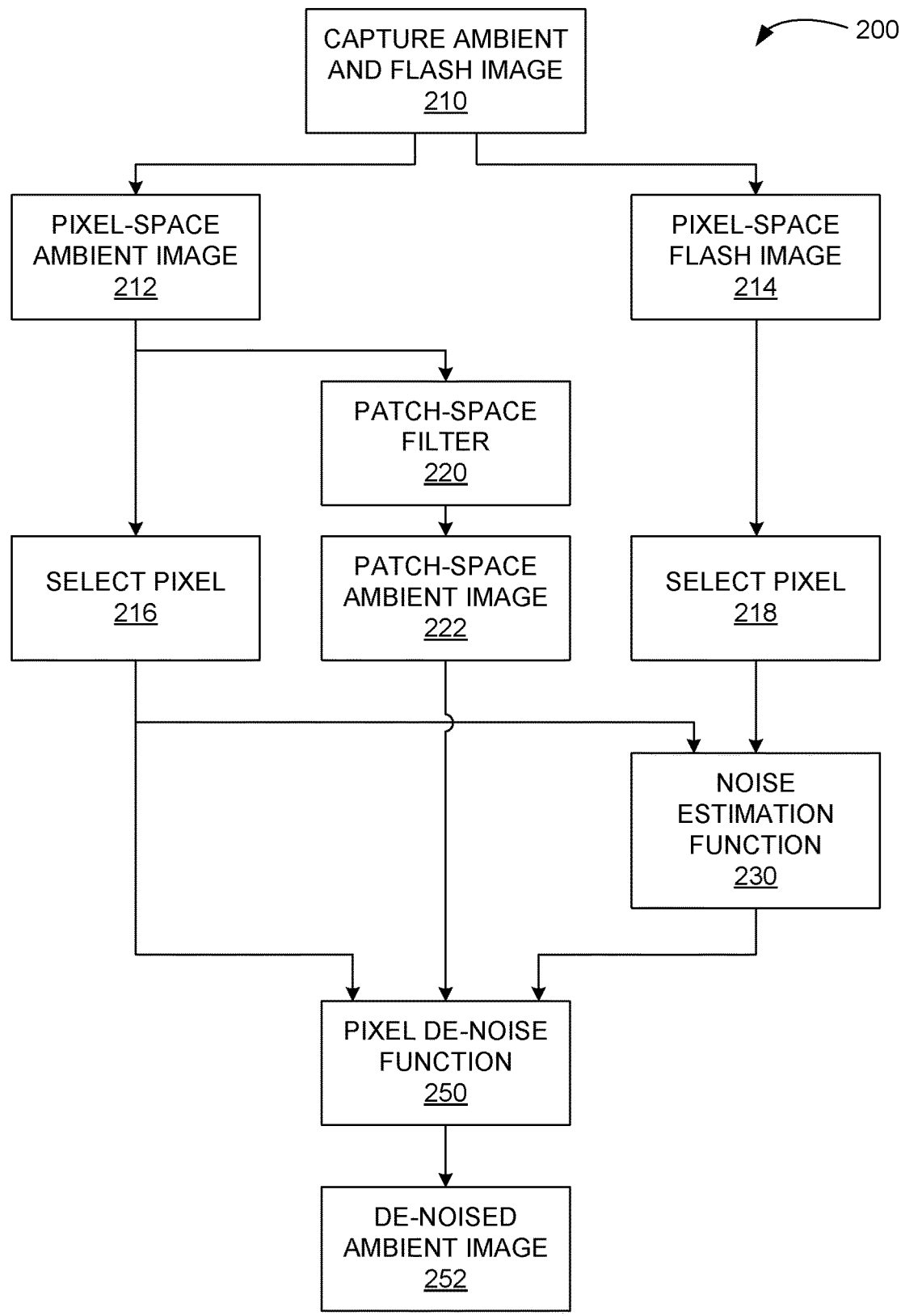
FIG. 2A illustrates a computational flow for generating a de-noised pixel, according to one embodiment of the present invention.

FIG. 2A illustrates a computational flow 200 for generating a de-noised pixel, according to one embodiment of the present invention. Computational flow 200 illustrates one embodiment of method 100 of FIG. 1A. A mobile device comprising a camera module, an electronic flash (e.g., one or more light-emitting diodes or a xenon strobe tube) and a processing unit may be configured to perform computational flow 200. At function 210, the mobile device captures a pixel-space ambient image 212 and a pixel-space flash image 214. In one embodiment, the mobile device captures an ambient image and a flash image according to method 106 of FIG. 1D. The ambient image is stored as pixel-space ambient image 212 and the flash image is stored as pixel-space flash image 214. A patch-space filter 220 generates a patch-space image 222 by performing any technically feasible resolution reduction operation on the pixel-space ambient image 212. Functions 216 and 218 select a pixel from their respective image source at the same, selected coordinate in both image sources. In one embodiment, functions 216 and 218 perform a simple raster scan to select pixels.

Noise estimation function 230 receives as inputs a selected ambient pixel (along with ISO metadata) and a selected flash pixel, and generates a pixel noise estimate from these these inputs. In one embodiment, the noise estimate is principally a function of the exposure conditions (e.g., ISO and intensity) for the pixels.

Pixel de-noise function 250 generates a de-noised pixel using the ambient pixel, patch-space ambient pixels sampled from the patch-space ambient image, and the pixel noise estimate as inputs. The de-noised pixel may be stored at the selected coordinate within a de-noised ambient image 252. In one embodiment, each pixel of de-noised ambient image 252 is generated according to computational flow 200. In certain embodiments, de-noised ambient image 252 may be combined with pixels-space flash image 214 to generate a merged image that may be stored and subsequently displayed.

Figure 2B:
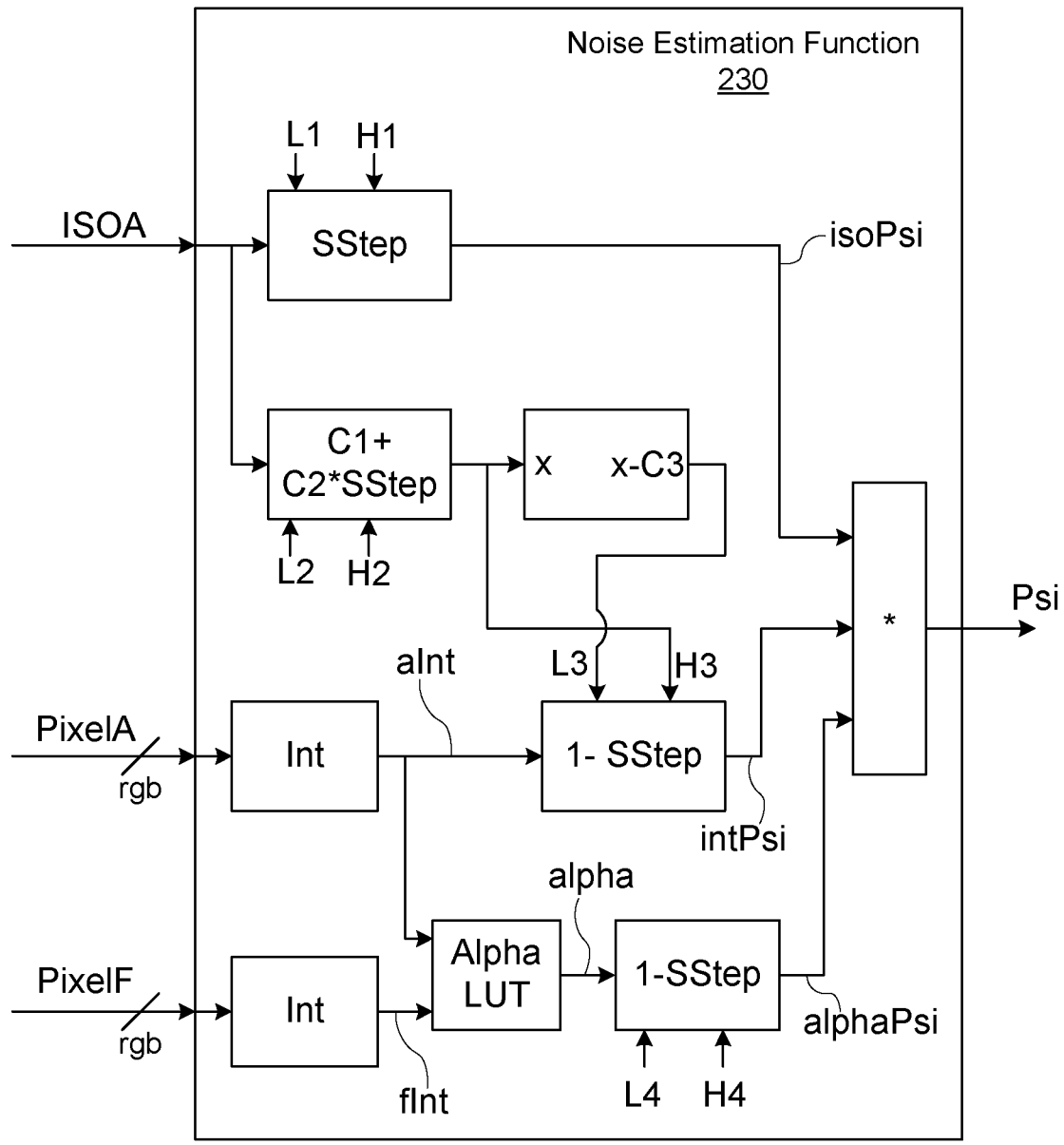
FIG. 2B illustrates a noise estimation function, according to one embodiment of the present invention.

FIG. 2B illustrates a noise estimation function 230, according to one embodiment of the present invention. One embodiment of method 102 of FIG. 1B is illustrated as noise estimation function 230 in the form of a computational flow diagram. As shown, three intermediate noise estimate values (isoPsi, intPsi, alphaPsi) are multiplied together to generate a pixel noise estimate (Psi). In one embodiment, the isoPsi intermediate noise estimate value may be generated according to the OpenGL code of Table 1, using a smoothstep function, indicated here as an "SStep" functional block. The intPsi intermediate noise estimate value may be generated according to the OpenGL code of Table 2. The alphaPsi intermediate noise estimate value may be generated according to the OpenGL code of Table 3. An intensity value (aInt) for a pixel-space ambient pixel (PixelA) is calculated and used as one input into an alpha look-up table (LUT) function. An intensity value (fInt) for a pixel-space flash pixel (PixelF) is calculated and used as a second input to the alpha LUT function. A resulting alpha value is then passed through a smoothstep function to calculate the alphaPsi value. The alpha LUT function is described in greater detail below in FIG. 3.

Figure 2C:
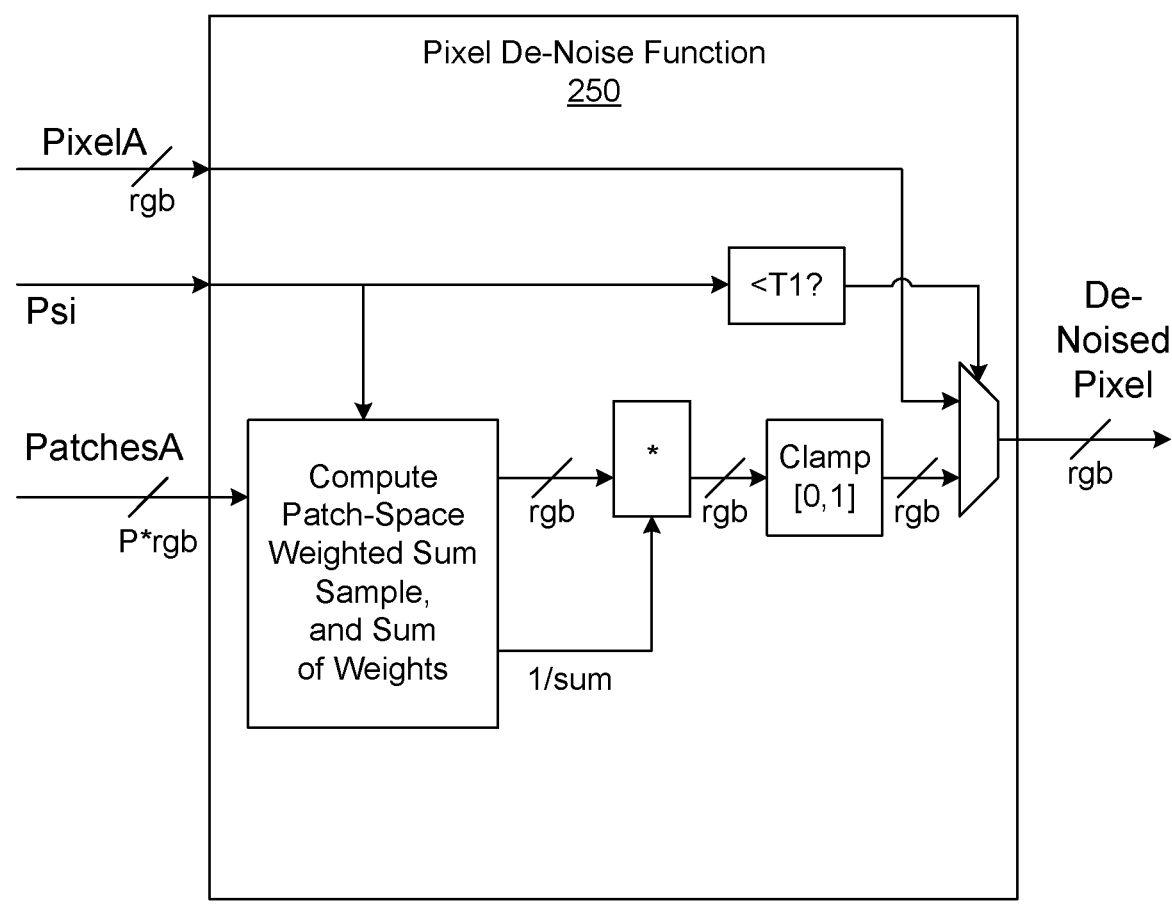
FIG. 2C illustrates a pixel de-noise function, according to one embodiment of the present invention.

FIG. 2C illustrates a pixel de-noise function 250, according to one embodiment of the present invention. One embodiment of method 104 of FIG. 1C is illustrated as noise estimation function 250 in the form of a computational flow diagram. As shown, the pixel de-noise function receives a set of patch-space samples (PatchesA), a pixel noise estimate (Psi), and a pixel-space ambient pixel as input and generates a de-noised pixel as output. In one embodiment, patch-space samples comprise lower resolution samples of the image associated with the pixel-space ambient pixel. Patch-space samples may be associated with a pixel-space pixel based on relative position (e.g., normalized coordinates ranging from 0.0 to 1.0) within the image. Each patch-space sample may be similar to, and representative of a small neighborhood of pixels comprising a patch. A de-noise operation may be performed by sampling a surrounding neighborhood of patch-space samples associated with an input pixel to generate a de-noised pixel that is similar to neighboring pixels. Using patch-space samples advantageously reduces computation associated with generating a de-noised pixel by pre-computing neighboring pixel similarity in the form of a patch-space sample. However, in certain embodiments, neighboring pixel similarity may be computed as needed for each input pixel.

In one embodiment, if Psi is below a threshold, T1, then the de-noised pixel is set equal to input PixelA. Otherwise, the de-noised pixel is computed from a weighted sum of pixels scaled according to a sum of corresponding weights, with the result clamped between 0.0 and a maximum color channel intensity value (e.g. 1.0). Consequently, a resulting de-noised pixel may vary from being an exact numeric copy of PixelA if Psi is below threshold T1, and a weighted sum of neighboring pixels. The threshold T1 may be assigned value based on camera module noise performance. In one embodiment, T1 is set to 0.3. Computing the patch-space weighted sum sample and sum of weights is described in greater detail below.

Figure 2D:
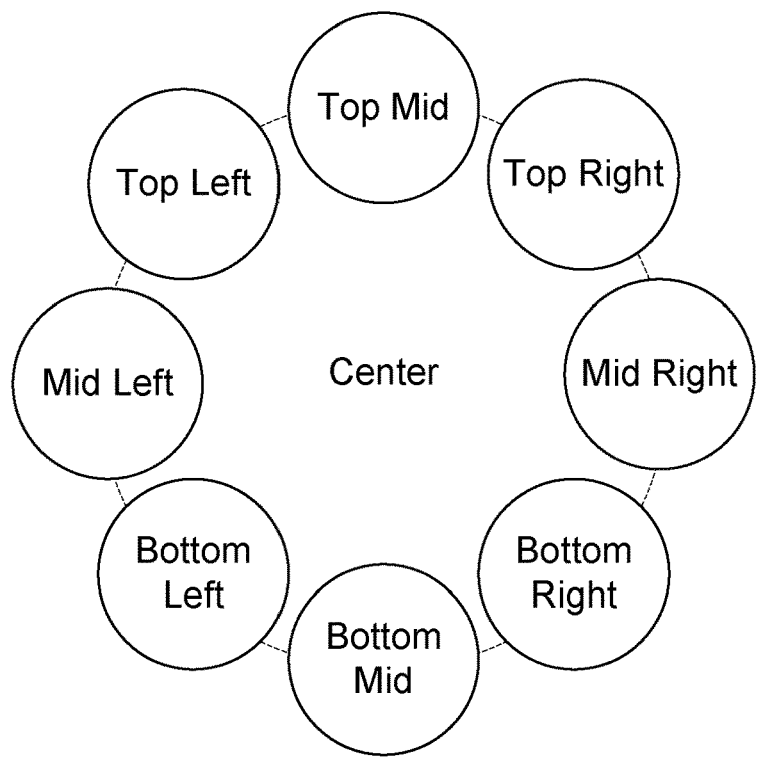
FIG. 2D illustrates patch-space samples organized around a central region, according to one embodiment of the present invention.

FIG. 2D illustrates patch-space samples organized around a central region, according to one embodiment of the present invention. As shown, eight patch-space samples form a substantially circular region about a center. The center may be located according to coordinates of the pixel-space pixel (input PixelA) of FIG. 2B-2C. The patch-space samples may be generated from a patch-space image using any technically feasible technique, such as bilinear sampling, that provides for substantially arbitrary placement of sample coordinates between discrete samples in patch-space.

Figure 2E:
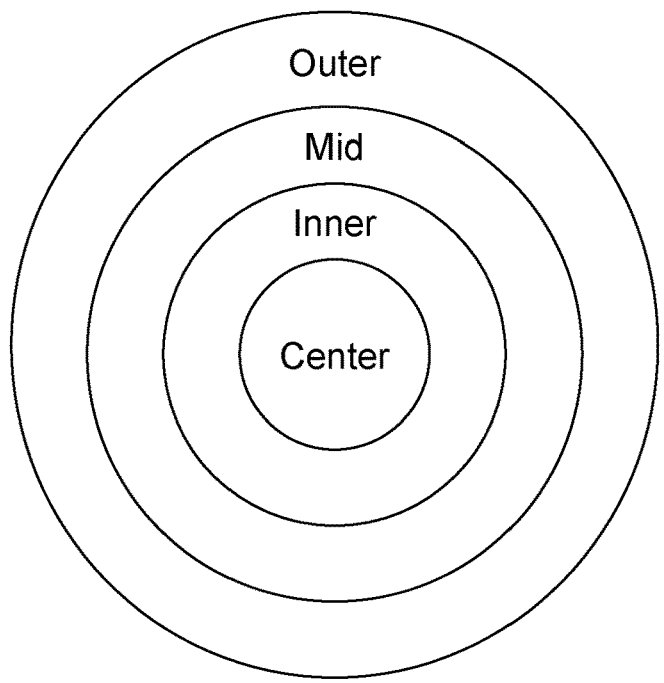
FIG. 2E illustrates patch-space regions organized around a center, according to one embodiment of the present invention.

FIG. 2E illustrates patch-space regions organized around a center, according to one embodiment of the present invention. The patch-space regions may be organized in ranks as an outer rank, a mid rank, an inner rank, and a center. In one embodiment, eight samples are generated for each rank, as illustrated above in FIG. 2D.

Figure 2F:
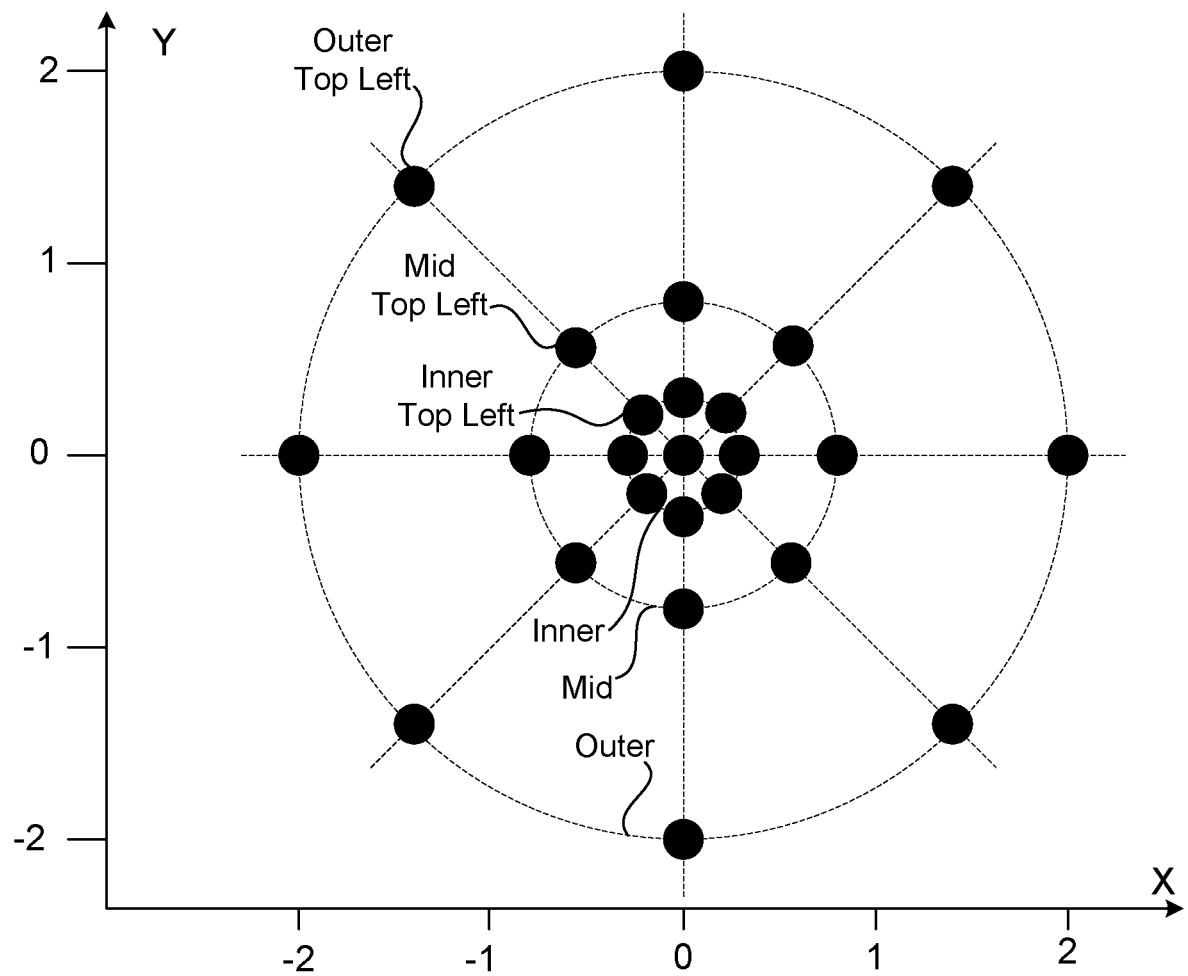
FIG. 2F illustrates a constellation of patch-space samples around a center position, according to one embodiment of the present invention.

FIG. 2F illustrates a constellation of patch-space samples around a center position, according to one embodiment of the present invention. As shown, eight sample positions for each rank are positioned in patch-space in a ring.

In one embodiment, a weight is calculated for each rank and each sample on a given rank contributes a correspondingly weighted value to the patch-space weighted sum sample of FIG. 2C. The sum of weights corresponds to a sum of all weights associated with samples contributing to the patch-space weighted sum sample. A center sample may be included in the patch-space weighted sum sample. The center sample may have an independent center weight. The center sample weight is added to the sum of weights. The center weight and rank weights may be calculated for each de-noised pixel. In certain implementations, the center weight is larger than an inner rank weight; the inner rank weight is larger than the mid rank weight; and, the mid rank weight is larger than the outer rank weight. The weights may be varied according to pixel noise estimate, Psi.

In one embodiment, the constellation as shown in FIG. 2F depicts a contribution zone around a pixel point. In one embodiment, the contribution zone may be manipulated (e.g. increased/decreased, etc.) to control the contribution of surrounding pixels, the weight of each surrounding sample in the constellation being determined as a function of estimated image noise at the pixel point, and optionally through a user input parameter (e.g., through a user interface slider control). For example, the greater an estimated noise at the pixel point, the greater the weight of mid and outer ranks. In regions of an image where estimated noise is high, the estimated noise values should vary relatively slowly over a span of many pixels (many tens of pixels), meaning the overall visual effect of de-noising scene content should remain consistent and change only slightly in response to small scene changes or camera movement. Consequently, the above technique for de-noising may generally provide stable, consistent appearance for de-noised scene content through multiple frames, such as multiple video frames.

Figure 2G:
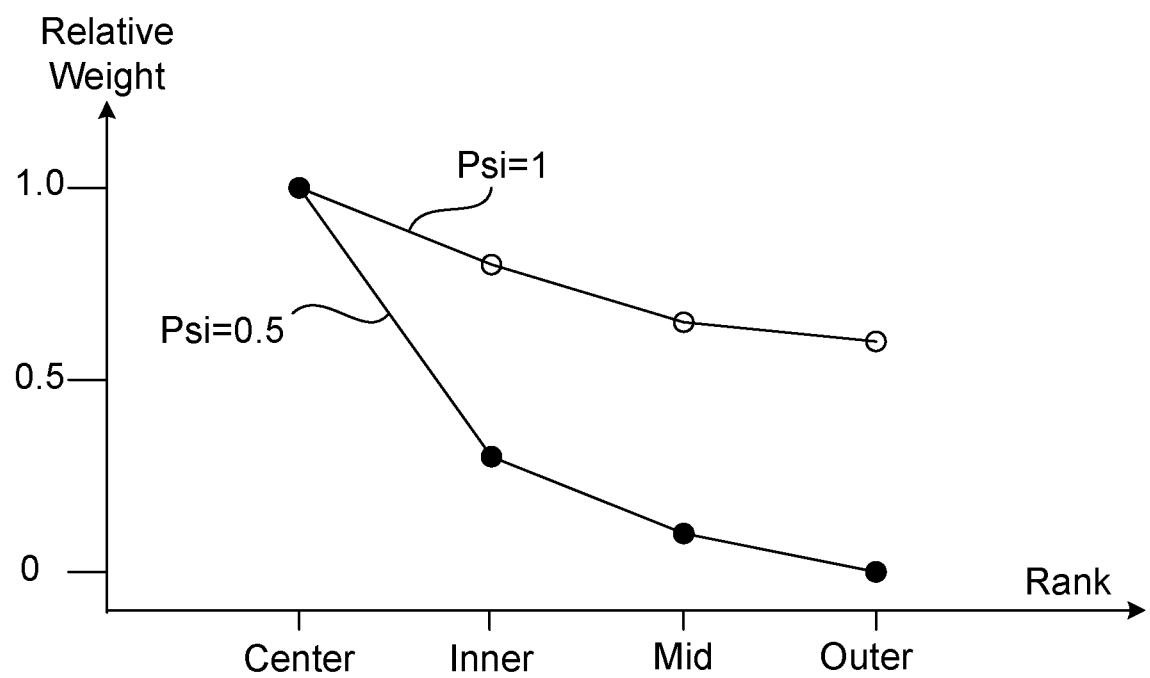
FIG. 2G illustrates relative weights for different ranks in a patch-space constellation, according to one embodiment of the present invention.

FIG. 2G illustrates relative weights for different ranks in a patch-space constellation, according to one embodiment of the present invention. As shown, when pixel noise estimate Psi is smaller, the inner, mid, and outer ranks may be assigned lower weights. When Psi is larger, the inner, mid, and outer ranks may be assigned higher weights. Samples at each angular position (top mid, top right, etc.) around the constellation of FIG. 2F may be weighted with the same weight, or a weight that is relatively higher or lower than other samples in the same rank, as a function of image content. Each rank and angle weight may be calculated independently to contribute to an overall patch-space weighted sum sample. In certain embodiments, image content determines sample weights for each angular position within a given rank. For example, an edge running through or along the center position should be preserved, even for pixels with high estimated noise. In such an instance, weights of samples that are more similar in color to the path of the edge closest to intersecting the center may be assigned higher weights, while dissimilar samples may be assigned low weights. Such weights may follow an overall scheme that adheres to the concentric rank weights, but is further refined to preserve a distinct edge. Various techniques may be implemented to detect similarity between a center sample and other patch-space samples within the constellation. In particular, techniques that preserve larger image patterns such as edge detection may be implemented to selectively assign weights to constellation samples.

In one embodiment, an edge detection pass is performed to generate an edge-enhanced image of the ambient image. The edge-enhanced image may be a single channel (gray scale) image where higher intensity indicates a more distinct edge, while lower intensity indicates a lack of a distinct edge. In regions where a more distinct edge is present, samples along the edge should be assigned higher weights, while samples not associated with an edge should be assigned lower weights. Alternatively, samples within the constellation having similar color and intensity to a representative (e.g., average, media, or other) color associated with samples along the edge should be assigned higher weights, while dissimilar samples may be assigned lower weights. For example, higher weights could range from 0.5 to 1.0 and lower weights could range from 0.0 to 0.5.

Figure 2H:
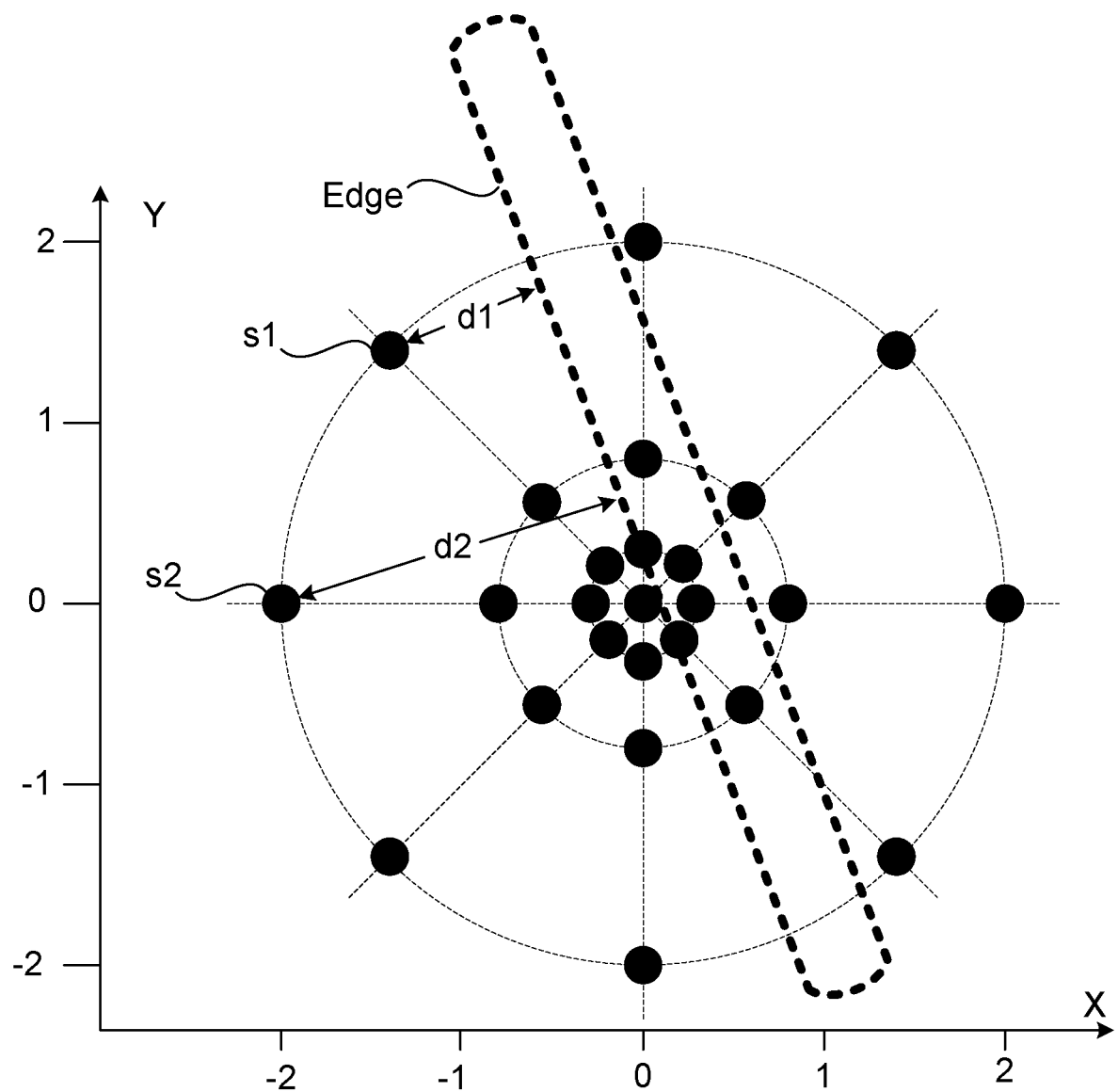
FIG. 2H illustrates assigning sample weights based on detected image features, according to one embodiment.

FIG. 2H illustrates assigning sample weights based on detected image features, according to one embodiment. In certain embodiments, different samples in the same rank (within the same ring) are assigned different weights to better preserve detected image features. In one embodiment, if the center sample is positioned in close proximity to (e.g., intersecting or within a few pixels of intersecting) a detected edge (e.g., as indicted by higher intensity values in a corresponding edge-enhanced image) in an image being de-noised, then weights of samples that are close to the edge (e.g., s1 at distance d1) may be calculated to be higher than weights of samples that are further from the edge (e.g., s2 at distance d2). In one embodiment, weights may be calculated to be an inverse function of proximity to the edge so that sample s1 with distance d1 from the edge is assigned a higher weight than sample s2 with a larger distance d2 from the edge. Weighting samples according to similarity along an edge as discussed in FIG. 2G or based on proximity to an edge as discussed here in FIG. 2H may be implemented to preserve edges and texture of an image being de-noised by distinguishing identifiable image features from noise.

Generating Alpha

Figure 3:
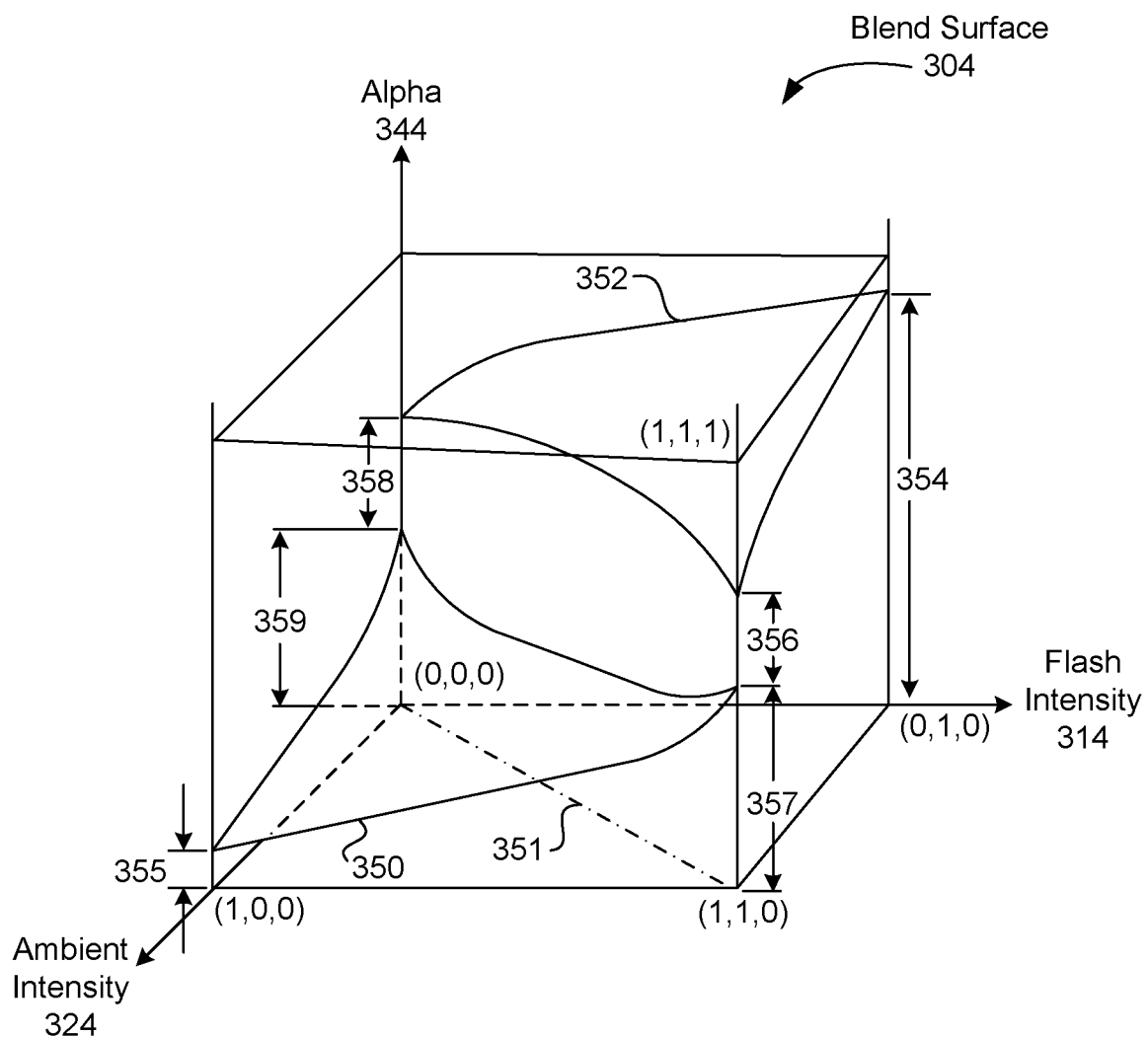
FIG. 3 illustrates a blend surface for estimating flash contribution at a pixel, according to one embodiment of the present invention.

FIG. 3 illustrates a blend surface 304 for blending two pixels, according to another embodiment of the present invention. Blend surface 304 comprises a flash dominant region 352 and an ambient dominant region 350 within a coordinate system defined by an axis for each of ambient intensity 324, flash intensity 314, and an alpha value 344.

As shown, upward curvature at the origin (0,0) and at (1,1) may be included within the ambient dominant region 350, and downward curvature at (0,0) and (1,1) may be included within the flash dominant region 352. As a consequence, a smoother transition may be observed for very bright and very dark regions, where color may be less stable and may diverge between a flash image and an ambient image. Upward curvature may be included within the ambient dominant region 350 along diagonal 351 and corresponding downward curvature may be included within the flash dominant region 352 along diagonal 351.

In certain embodiments, downward curvature may be included within ambient dominant region 350 at (1,0), or along a portion of the axis for ambient intensity 324. Such downward curvature may have the effect of shifting the weight of mix operation 346 to favor ambient pixel 322 when a corresponding flash pixel 312 has very low intensity.

In one embodiment, a blend surface 304, is pre-computed and stored as a texture map that is established as an input to a fragment shader configured to implement step 136 of method 102. A surface function that describes a blend surface having an ambient dominant region 350 and a flash dominant region 352 may be implemented to generate and store the texture map. The surface function may be implemented on a CPU core or a GPU core, or a combination thereof of cores residing within processor complex 410 of FIG. 4C. The fragment shader executing on a GPU core may use the texture map as a lookup table implementation of the surface function. In alternative embodiments, the fragment shader implements the surface function and computes an alpha value 344 as needed for each combination of a flash intensity 314 and an ambient intensity 324. One exemplary surface function that may be used to compute an alpha value 344 (alphaValue) given an ambient intensity 324 (ambient) and a flash intensity 314 (flash) is illustrated below as pseudo-code in Table 4. A constant "e" is set to a value that is relatively small, such as a fraction of a quantization step for ambient or flash intensity, to avoid dividing by zero. Height 355 corresponds to constant 0.125 divided by 3.0.

TABLE 4 fDivA = flash/(ambient + e);
fDivB = (1.0 − ambient)/((1.0 − flash) + (1.0 − ambient) + e);
temp = (fDivA >= 1.0) ? 1.0: 0.125;
alphaValue = (temp + 2.0 * fDivB)/3.0;

In certain embodiments, the blend surface is dynamically configured based on image properties associated with a given flash image and associated ambient image. Dynamic configuration of the blend surface may include, without limitation, altering one or more of heights 354 through 359, altering curvature associated with one or more of heights 354 through 359, altering curvature along diagonal 351 for ambient dominant region 350, altering curvature along diagonal 351 for flash dominant region 352, or any combination thereof.

One embodiment of dynamic configuration of a blend surface involves adjusting heights associated with the surface discontinuity along diagonal 351. Certain images disproportionately include gradient regions having flash pixels and ambient pixels of similar or identical intensity. Regions comprising such pixels may generally appear more natural as the surface discontinuity along diagonal 351 is reduced. Such images may be detected using a heat-map of ambient intensity 324 and flash intensity 314 pairs within a surface defined by ambient intensity 324 and flash intensity 314. Clustering along diagonal 351 within the heat-map indicates a large incidence of flash pixels and ambient pixels having similar intensity within an associated scene. In one embodiment, clustering along diagonal 351 within the heat-map indicates that the blend surface should be dynamically configured to reduce the height of the discontinuity along diagonal 351. Reducing the height of the discontinuity along diagonal 351 may be implemented by adding downward curvature to flash dominant region 352 along diagonal 351, adding upward curvature to ambient dominant region 350 along diagonal 351, reducing height 358, reducing height 356, or any combination thereof. Any technically feasible technique may be implemented to adjust curvature and height values without departing the scope and spirit of the present invention. Furthermore, any region of blend surface 304 may be dynamically adjusted in response to image characteristics without departing the scope of the present invention.

In one embodiment, dynamic configuration of the blend surface comprises mixing blend values from two or more pre-computed lookup tables implemented as texture maps. For example, a first blend surface may reflect a relatively large discontinuity and relatively large values for heights 356 and 358, while a second blend surface may reflect a relatively small discontinuity and relatively small values for height 356 and 358. Here, blend surface 304 may be dynamically configured as a weighted sum of blend values from the first blend surface and the second blend surface. Weighting may be determined based on certain image characteristics, such as clustering of flash intensity 314 and ambient intensity 324 pairs in certain regions within the surface defined by flash intensity 314 and ambient intensity 324, or certain histogram attributes for the flash image and the ambient image. In one embodiment, dynamic configuration of one or more aspects of the blend surface, such as discontinuity height, may be adjusted according to direct user input, such as via a UI tool.

System Overview

FIG. 4A illustrates a front view of a mobile device 470 comprising a display unit 412, according to one embodiment of the present invention. Display unit 412 is configured to display digital photographs and user interface (UI) elements associated with software applications that may execute on mobile device 470. The digital photographs may include digital images captured or otherwise generated by the mobile device 470, digital images transmitted to the mobile device 470, or any combination thereof. As shown, mobile device 470 may include a user-facing (back-facing) camera 472, with a lens configured to face back towards a user; that is, the lens may face the same direction that display unit 412 is configured to face. User-facing camera 472 may also be referred to as a "selfie" camera. Mobile device 470 may also include a user-facing strobe unit 474, configured to provide illumination in the same direction as user-facing camera 472, thereby providing strobe illumination for taking a "selfie" picture. User facing camera 472 may capture images with or without strobe illumination. Furthermore, the images may be captured with a combination of both strobe illumination and no strobe illumination. In certain embodiments, display unit 412 may be configured to provide strobe illumination and/or augment strobe illumination from user-facing strobe unit 474. In certain embodiments, mobile device 470 may include two or more user-facing cameras that are configured to capture one or more images each; these images may be stored within an image stack and fused to generate a merged image. One or more of the images may be de-noised, such as according to the de-noising techniques of FIGS. 2A-2H. For example, in one embodiment, an ambient image is captured using one or more of the two or more user-facing cameras, and a flash image is captured using one or more of the two or more user-facing cameras. The ambient image may be de-noised using any technically feasible technique, and merged with the flash image to generate a merged image. The merged image may comprise a final image the user may view, save, share, or otherwise utilize. Alternatively, the merged image rather than the ambient image may be de-noised.

FIG. 4B illustrates a back view of mobile device 470 comprising a front-facing camera 476 and a front-facing strobe unit 478, according to one embodiment of the present invention. Front-facing camera 476 and front-facing strobe 478 may both face in a direction that is opposite to that of display unit 412 and/or user-facing camera 472. The front-facing camera 476 and front-facing strobe unit 478 may operate as described previously regarding user-facing camera 472 and user-facing strobe unit 474, respectively.

FIG. 4C illustrates a block diagram of mobile device 470, according to one embodiment of the present invention. As shown, mobile device 470 includes a processor complex 410 coupled to display unit 412. Mobile device 470 may also include, without limitation, a camera module 430, a strobe (flash) unit 436, a set of input/output devices 414, non-volatile memory 416, volatile memory 418, a wireless unit 440, and sensor devices 442, each coupled to processor complex 410. In one embodiment, a power management subsystem 420 is configured to generate appropriate power supply voltages for each electrical load element within mobile device 470, and a battery 422 is configured to supply electrical energy to power management subsystem 420. Battery 422 may implement any technically feasible battery, including primary or rechargeable battery technologies. Alternatively, battery 422 may be implemented as a fuel cell, or high capacity electrical capacitor.

In one usage scenario, strobe (flash) illumination 437 comprises at least a portion of overall illumination in a scene being photographed by camera module 430. Optical scene information 439, which may include strobe illumination 437 reflected from objects in the scene, is focused onto an image sensor 432 as an optical image. Image sensor 432, within camera module 430, generates an electronic representation of the optical image. The electronic representation comprises spatial color intensity information, which may include different color intensity samples for red, green, and blue light.

Display unit 412 is configured to display a two-dimensional array of pixels comprising a digital image. Display unit 412 may comprise a liquid-crystal display, an organic LED display, or any other technically feasible type of display. Input/output devices 414 may include, without limitation, a capacitive touch input surface, buttons, knobs, or any other technically feasible device or devices for receiving user input and converting the input to electrical signals. Input/output devices 414 may also comprise components for converting electrical signals to human-perceptible signals. For example, Input/output devices 414 may include an audio speaker. In one embodiment, display unit 412 and a capacitive touch input surface are manufactured together to form a touch entry display system.

Non-volatile (NV) memory 416 is configured to store data when power is interrupted. The NV memory 416 therefore implements a non-transitory computer-readable medium. In one embodiment, NV memory 416 comprises one or more flash memory devices. NV memory 416 may be configured to include programming instructions for execution by one or more processing units within processor complex 410. The programming instructions may include, without limitation, an operating system (OS), user interface (UI) modules, imaging processing and storage modules, and modules implementing one or more embodiments of techniques taught herein. In particular, the NV memory 416 may be configured to store instructions that implement method 100 of FIG. 1A and method 102 of FIG. 1B. The instructions, when executed by processing units within processor complex 410, cause the processing units to perform these methods. One or more memory devices comprising NV memory 416 may be packaged as a module that can be installed or removed by a user. In one embodiment, volatile memory 418 comprises dynamic random access memory (DRAM) configured to temporarily store programming instructions, image data, and the like needed during the course of normal operation of mobile device 470.

Sensor devices 442 include sensors configured to detect at least device orientation of the mobile device 470. For example, sensor devices 442 may include an accelerometer to detect motion and orientation, an electronic gyroscope to detect motion and orientation, or a combination thereof. Sensor devices 442 may also include, without limitation, a magnetic flux detector to detect orientation, a global positioning system (GPS) module to detect geographic position, or any combination thereof.

Wireless unit 440 may include one or more digital radios configured to send and receive digital data. In particular, wireless unit 440 may implement wireless standards known in the art as "WiFi" based on institute for electrical and electronics engineers (IEEE) standard 802.11, and may implement digital cellular telephony standards for data communication such as the well-known "3G" and long term evolution ("LTE"), or "4G" suites of standards. In one embodiment, mobile device 470 is configured to transmit one or more digital photographs residing within either NV memory 416 or volatile memory 418 to an online photographic media service via wireless unit 440. In such an embodiment, a user may possess credentials to access the online photographic media service and to transmit the one or more digital photographs for storage and presentation by the online photographic media service. The credentials may be stored or generated within mobile device 470 prior to transmission of the digital photographs. The online photographic media service may comprise a social networking service, photograph sharing service, or any other web-based service that provides storage and download of digital photographs. In certain embodiments, mobile device 470 is configured to receive one or more incoming digital photographs via wireless unit 440, and store the incoming digital photographs in the NV memory 416, or the volatile memory 418, or a combination thereof.

In certain embodiments, a non-transitory computer-readable medium is configured to store programming instructions that, when executed by a processor, perform the methods described herein. Specifically, the programming instructions direct one or more processing units within processor complex 410 to perform methods 100, 102, 104, 106, or any combination thereof. The non-transitory computer-readable medium should include instructions to direct camera module 430 and strobe unit 436 to capture an ambient image and a flash image, according to methods 100 and 106. The non-transitory computer-readable medium should include instructions to direct a specialized multi-threaded processing unit, such as a graphics processing unit (GPU) or digital signal processing unit (DSP) to perform methods 102 and 104 to de-noise the ambient image or an image generated by combining the ambient image and the flash image.

In one embodiment, camera module 430 implements user-facing camera 472 and strobe unit 436 implements user-facing strobe unit 474. In another embodiment camera module 430 implements user-facing camera 476 and strobe unit 436 implements user-facing strobe unit 478. In certain embodiments, mobile device 470 may include two or more instances each of camera module 430 and one or more instance of strobe unit 436. For example, mobile device 470 may include one instance of camera module 430 in a user-facing configuration (e.g. user-facing camera 472) and two different instances of camera modules 430 in a front-facing configuration (two front-facing cameras 476). Similarly, mobile device 470 may include an instance of strobe unit 436 in a user-facing configuration (e.g., user-facing strobe unit 474) and a different instance of strobe unit 436 in a front-facing configuration (front-facing strobe unit 478).

In certain embodiments, two or more instances of mobile device 470 may communicate to generate temporally-coordinated flash illumination using corresponding instances of a strobe unit 436. In such an embodiment, at least one instance of strobe unit 436 is included within each of the two or more mobile devices 470, and the two or more strobe units 436 are enabled concurrently, and at least one image is captured by one or more of the two or more mobile devices 470 while two strobe units 436 are enabled. Furthermore, at least one image is captured by one or more of the two or more mobile devices 470 while two strobe units 436 are disabled. A merged image may be generated by fusing at least one image captured while the strobe units are enabled (flash image) with at least one image captured while the strobe units are disabled (ambient image). Furthermore, the ambient image may be de-noised prior to being fused with a flash image. Alternatively, or additionally, the fused image may be de-noised. Any technically feasible de-noising technique may be applied to the ambient image and/or fused image. For example, in one embodiment, the de-noising techniques of FIGS. 2A-2H are applied to the ambient image prior to being fused with the flash image.

In one embodiment, mobile device 470 is configured to sample images in visible and infrared wavelengths. For example, mobile device 470 may include two or more different camera modules 430, with each configured to be sensitive to different photonic wavelength ranges. Furthermore, mobile device 470 may include two front-facing camera modules 430, with a first of the two camera modules 430 conventionally sensitive to at least visible light and a second of the two camera modules 430 sensitive to at least infrared (IR) light. In such an embodiment, the second camera module 430 may be sensitive to near infrared (NIR) light in at least a portion of the range 0.75 to 1.4 microns, and/or sensitive to short-wave infrared light (SWIR) light in at least a portion of the range 1.4-3.0 microns. Alternatively, one or more of the two camera modules may be sensitive to both visible light and IR light. A front-facing strobe unit 478 may be configured to generate NIR light, SWIR light, visible light, or a combination thereof. The mobile device 470 may sample a set of images comprising an IR (e.g., NIR, SWIR) image, a visible light image, or a combination thereof. The mobile device 470 may fuse at least two of the images to generate a merged image.

In one embodiment, front-facing strobe unit 478 generates IR (e.g., NIR, SWIR) strobe illumination and visible illumination concurrently. Furthermore, an IR image captured using the IR strobe illumination may provide an intensity image, while a visible light image generated using visible strobe illumination may provide color data that is fused with the intensity image to generate a merged image. In such an embodiment, the visible strobe illumination may have a relatively low intensity because only per-pixel color information that may be independent of intensity information is needed. Furthermore, per-pixel intensity information may be provided, at least in part, by the IR image. A fused image that combines color information and intensity information may yield an image having a natural color appearance, but with a lower requirement of visible flash intensity during capture. Such an embodiment may advantageously provide superior flash images in low light-settings without unpleasantly bright visible flash illumination hitting photographic subjects. In certain embodiments, an IR image provides a portion of intensity information and a visible light image also provides a portion of intensity information. Determining each portion may be computed per pixel or per scene, or determined by a user interacting with a UI control. At each pixel, an intensity value may be generated based on both IR and visible intensity information.

Of course, in another embodiment, an IR image captured using the IR strobe illumination may provide information associated with intensity, sharpness, one or more points of focus, and/or brightness, any of which may be fused with a visible image to create a merged image.

In certain embodiments, an image sensor implements an RGB-IR color sensitivity pattern and the IR image and the visible light image may be sampled using the same image sensor within camera module 430.

In one embodiment, a UI slider control is provided to allow the user to control a contribution of the IR image to a merged image. Furthermore, a UI slider control may be provide to allow the user to control an overall flash contribution to the merged image. Any combination of such sliders may also be provided.

Figure 5:
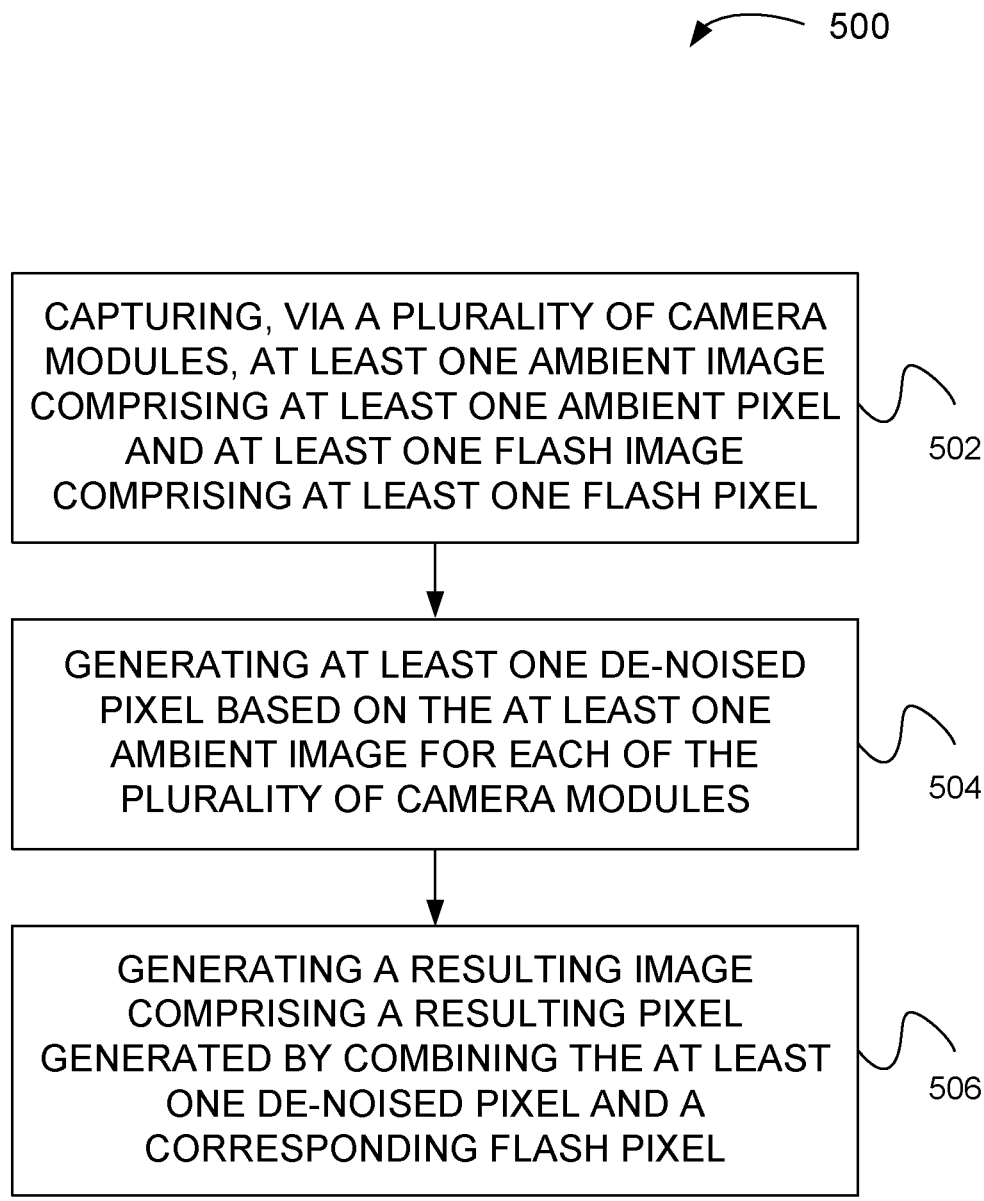
FIG. 5 illustrates an exemplary method for generating a de-noised pixel based on a plurality of camera modules, in accordance with one possible embodiment.

FIG. 5 illustrates an exemplary method 500 for generating a de-noised pixel based on a plurality of camera modules, in accordance with one possible embodiment. As an option, the exemplary method 500 may be implemented in the context of the details of any of the Figures. Of course, however, the exemplary method 500 may be carried out in any desired environment. For example, method 500 may be carried out by a mobile device such as a smartphone or a stand-alone digital camera, each configured to include the plurality of camera modules. Furthermore, the plurality of camera modules may be configured to operate with one or more flash illumination modules.

Step 502 shows capturing, via a plurality of camera modules, at least one ambient image comprising at least one ambient pixel and at least one flash image comprising at least one flash pixel. Next, at least one de-noised pixel is generated based on the at least one ambient image for each of the plurality of camera modules. See step 504. Lastly, a resulting image is generated comprising a resulting pixel generated by combining the at least one de-noised pixel and a corresponding flash pixel. See step 506.

In one embodiment, a plurality of camera modules may be found within one device (e.g. multiple circuits, etc.). In another embodiment, a plurality of camera modules may be found in more than one device (e.g. within a smartphone and within a tablet, etc.).

Further, in one embodiment, exposure may be harmonized between a plurality of camera modules, wherein the harmonizing includes normalizing the pixel intensity between one camera module and another, synchronizing capture time, and the like. In some embodiments, the pixel intensity may be based on a specific pixel (and corresponding pixel on other camera modules, etc.), on a grouping of pixels, on a histogram point (e.g. brightest/darkest point, etc.), exposure parameters, etc. Still yet, in another embodiment, exposure may be dependent on multi-metering. For example, spot, center, average, or partial metering may be used to determine the exposure for the captured image.

Further, multiple points may be used when metering. For example, an object (e.g. face, etc.) in the foreground may be metered in addition to an object (e.g. tree, etc.) in the background. In each case, metering may be performed with any of the above described exposure goals and, optionally, implemented using any technically feasible metering techniques.

Further, multiple captures may be performed for each ambient image and each flash image. For example, in one embodiment, an ambient image may be captured at t=0 and a flash image may be captured at t=1, and multiple images may be captured between t=0 and t=1 such that as the flash is being increased/ramped up, or otherwise modulated while the multiple images are sequentially and/or concurrently captured. Again, in each case, metering may be performed with any of the above described exposure goals. In one embodiment, a de-noise operation may be performed on one or more of the ambient images captured by the plurality of camera modules. The de-noise operation generates corresponding de-noised images. One or more of the de-noised images may be combined with corresponding flash images captured by one or more camera modules of the plurality of camera modules to generate one or more merged images.

In certain embodiments, two or more ambient images are captured by a set of two or more camera modules, with each ambient image captured according to different exposure parameters. The two or more ambient images may be combined to generate an HDR ambient image. In certain embodiments, the HDR ambient image is one of a plurality of frames of HDR video, with additional frames similarly generated. In Other embodiments, two or more flash images are captured by two or more camera modules, which may comprise the set of two or more camera modules. In one embodiment, the two or more flash images are combined to generate an HDR flash image. In certain embodiments, the HDR flash image is one of a plurality of frames of an HDR video. In certain embodiments the HDR ambient image and the HDR flash image are combined to generate an HDR merged image. In one embodiment the HDR merged image is one of a plurality of frames of HDR merged video.

In certain embodiments, the camera subsystem of a mobile device is configured to take a flash photo by default in most indoors and low-light settings, unless otherwise directed to not take a flash photo. However, certain venues where a user may be inclined to take a photo (e.g., restaurants, museums, art galleries, and the like) may have no flash policies in place that direct guests to not use their camera flash. Certain embodiments address this constraint on the use of flash photography by determining whether a venue associated with a current device location has a no flash policy. For example, the mobile device may be configured to perform a geolocate operation to determine the current location of the device and a geolocation query to determine whether the venue has a no flash policy. The geolocate operation may be performed using any technique or combination of techniques, such as global positioning satellite (GPS) location, cellular tower triangulation, and the like. The geolocation query may be performed using any technically feasible technique that retrieves location-based information. In one embodiment, the location-based information includes at least a status flag for the venue that indicates whether the venue has a no flash policy. Alternatively, a wireless transmission device, such as a WiFi access point, located on or near the premises may be configured to advertise a flag that indicates whether the venue has a no flash policy. In such an embodiment, the mobile device is configured to detect the flag indicating a no flash policy.

More generally, the wireless transmission device may be configured to advertise other venue-specific policies such as no outgoing cellular phone calls, no speaker phone calls, no music played through a device's speaker, etc. The wireless transmission device may be configured to advertise such policies through an administrative webpage, physical control inputs on the transmission device, and the like.

In certain embodiments, a user asserts a shutter release action (e.g., presses a virtual button on a UI interface) and the mobile device 470 initiates an image capture sequence to capture an ambient image and a flash image. In one embodiment, the capture sequence includes monitoring an accelerometer and/or electronic gyroscope to estimate when camera motion is at a minimum prior to capturing final ambient and flash images. In this way, the user may, in certain cases, perceive a modestly increased shutter lag, but a resulting image may be crisper overall, having had the benefit of less camera motion during at least a portion of the ambient, and/or flash exposures. In certain embodiments, camera module 430 and processor complex 410 may coordinate functions to perform exposure metering and focus operations while waiting for a time when camera motion is at a minimum.

While the techniques disclosed herein are described in conjunction with a mobile device, persons skilled in the art will recognize that any digital imaging system comprising a digital camera (camera module), digital display, and signal processing resources may be configured to implement the techniques.

While the foregoing is directed to embodiments of the present invention, other and further embodiments of the invention may be devised without departing from the basic scope thereof, and the scope thereof is determined by the claims that follow.

What is claimed is:

1. A method, comprising:
capturing, via at least one camera module, an ambient image comprising a plurality of ambient pixels and a flash image comprising a plurality of flash pixels;
generating at least one de-noised pixel based on the ambient image by:
computing a patch-space sample at a location in a patch-space that corresponds to a location of the at least one de-noised pixel in a pixel-space,
upon determining that a pixel noise estimate is above a predefined threshold, assigning a first value of the patch-space sample to the at least one de-noised pixel, and
upon determining that the pixel noise estimate is below the predefined threshold, assigning a first value of an ambient pixel of the plurality of ambient pixels to the at least one de-noised pixel; and
generating a resulting image comprising a resulting pixel generated by combining the at least one de-noised pixel and a corresponding flash pixel,
wherein the flash image is captured while an associated strobe unit is enabled and the ambient image is captured while the associated strobe unit is disabled.

2. The method of claim 1, wherein the at least one de-noised pixel is further generated based on a pixel noise estimate calculated by performing the steps of:
calculating a first intermediate noise estimate based on an ambient image ISO value; and
calculating a second intermediate noise estimate based on the ambient image ISO value and an ambient pixel intensity;
combining the first intermediate noise estimate, and the second intermediate noise estimate to create an overall pixel noise estimate.

3. The method of claim 2, wherein the first intermediate noise estimate is calculated as a smoothstep function configured to receive the ambient image ISO value as an input, a first ISO value as a left edge value, and a second ISO value as a right edge value.

4. The method of claim 2, wherein the second intermediate noise estimate is calculated as a smoothstep function configured to receive the ambient pixel intensity as an input, a left edge value that is a function of the ambient image ISO, and a right edge value that is an offset from the left edge value.

5. The method of claim 2, wherein the pixel noise estimate is calculated using a third intermediate noise estimate including at least one of a user input term or an image feature.

6. The method of claim 5, wherein the third intermediate noise estimate is used to create the overall pixel noise estimate.

7. The method of claim 5, wherein the overall pixel noise estimate is created by combining the first intermediate noise estimate, the second intermediate noise estimate, and the third intermediate noise estimate.

8. The method of claim 1, wherein at least one of the flash image and the ambient image is generated by combining a visible light image with an infrared image, and wherein the associated strobe unit is configured to generate at least infrared illumination for exposing the infrared image.

9. The method of claim 1, wherein the at least one de-noised pixel is further generated based on the pixel noise estimate, which is a function of at least an ambient image ISO value, an ambient pixel intensity, and a corresponding flash pixel intensity.

10. The method of claim 1, wherein the location in the pixel-space is selected to correspond to the ambient pixel and a corresponding flash pixel.

11. The method of claim 1, further comprising using a de-noising weight to define an amount by which at least one ambient pixel of the plurality of ambient pixels and at least one flash pixel of the plurality of flash pixels is made to appear visually similar to a plurality of pixels surrounding either the at least one ambient pixel or the at least one flash pixel.

12. The method of claim 1, wherein the combining of the at least one de-noised pixel and the corresponding flash pixel is performed by a mix function.

13. The method of claim 12, wherein the mix function includes a mix function weight that is calculated according to a blend surface, the blend surface including a flash dominant region and an ambient dominant region, and the blend surface being further defined by an ambient intensity, a flash intensity, and an alpha value.

14. The method of claim 1, further comprising performing an edge detection pass on the ambient pixel of the plurality of ambient pixels of the ambient image to generate an edge-enhanced image, wherein the edge-enhanced image is used to assign de-noising weights.

15. The method of claim 1, wherein a first camera module is configured to capture the ambient image, and a second camera module is configured to capture the flash image, wherein the ambient image is generated by combining two or more images by the first camera module, and the flash image is generated by combining two or more images by the second camera module.

16. The method of claim 1, wherein the at least one de-noised pixel is generated based on a contribution zone around each of the plurality of ambient pixels associated with the ambient image, the contribution zone being used to control a weight of each of the plurality of ambient pixels associated with the ambient image.

17. A computer program product embodied on a non-transitory computer readable medium, comprising:
   code for capturing, via at least one camera module, an ambient image comprising a plurality of ambient pixels and a flash image comprising a plurality of flash pixels;
   code for generating at least one de-noised pixel based on the ambient image by:
      computing a patch-space sample at a location in a patch-space that corresponds to a location of the at least one de-noised pixel in a pixel-space,
      upon determining that a pixel noise estimate is above a predefined threshold, assigning a first value of the patch-space sample to the at least one de-noised pixel, and
      upon determining that the pixel noise estimate is below the predefined threshold, assigning a first value of an ambient pixel of the plurality of ambient pixels to the at least one de-noised pixel; and
   code for generating a resulting image comprising a resulting pixel generated by combining the at least one de-noised pixel and a corresponding flash pixel.

18. An apparatus, comprising:
   circuitry for:
   capturing, via at least one camera module, an ambient image comprising a plurality of ambient pixels and a flash image comprising a plurality of flash pixels;
   generating at least one de-noised pixel based on the ambient image by:
      computing a patch-space sample at a location in a patch-space that corresponds to a location of the at least one de-noised pixel in a pixel-space,
      upon determining that a pixel noise estimate is above a predefined threshold, assigning a first value of the patch-space sample to the at least one de-noised pixel, and
      upon determining that the pixel noise estimate is below the predefined threshold, assigning a first value of an ambient pixel of the plurality of ambient pixels to the at least one de-noised pixel; and
   generating a resulting image comprising a resulting pixel generated by combining the at least one de-noised pixel and a corresponding flash pixel.

* * * * *